(12) United States Patent
Dimasi

(10) Patent No.: US 10,591,123 B2
(45) Date of Patent: Mar. 17, 2020

(54) SOLAR LIGHT SYSTEMS, AND RELATED COMPONENTS AND METHODS

(71) Applicant: BrightSpace Technologies, Inc., Boulder, CO (US)

(72) Inventor: Joseph A. Dimasi, Boulder, CO (US)

(73) Assignee: BrightSpace Technologies, Inc., Boulder, CO (US)

( * ) Notice: Subject to any disclaimer, the term of this patent is extended or adjusted under 35 U.S.C. 154(b) by 0 days.

(21) Appl. No.: 15/740,754

(22) PCT Filed: Jul. 1, 2016

(86) PCT No.: PCT/US2016/040840
§ 371 (c)(1),
(2) Date: Dec. 28, 2017

(87) PCT Pub. No.: WO2017/004588
PCT Pub. Date: Jan. 5, 2017

(65) Prior Publication Data
US 2018/0187849 A1    Jul. 5, 2018

Related U.S. Application Data

(60) Provisional application No. 62/188,134, filed on Jul. 2, 2015.

(51) Int. Cl.
*F21S 11/00* (2006.01)
*G02B 17/08* (2006.01)
(Continued)

(52) U.S. Cl.
CPC ............. *F21S 11/005* (2013.01); *F21S 11/00* (2013.01); *F21S 11/007* (2013.01);
(Continued)

(58) Field of Classification Search
CPC .............................. F21S 11/007; F21S 11/005
See application file for complete search history.

(56) References Cited

U.S. PATENT DOCUMENTS 4,297,000 A   10/1981 Fries
4,743,082 A    5/1988 Mori
(Continued)

FOREIGN PATENT DOCUMENTS

CN    201589185 U    9/2010
CN    103095177 A    5/2013
(Continued)

OTHER PUBLICATIONS

Fraas, L.M. et al.; "Infrared Photovoltaics for Combined Solar Lighting and Electricity for Buidlings"; JX Crystals Inc., Issaquah, Washington, and Oak Ridge National Laboratory, Oakridge, Tennessee; (Undated); 4 pages; accessible at http://citeseerx.ist.psu.edu/viewdoc/download?doi=10.1.1.476.5437&rep=rep1&type=pdf.
(Continued)

*Primary Examiner* — Christopher E Mahoney
(74) *Attorney, Agent, or Firm* — Snell & Wilmer LLP

(57) ABSTRACT

A solar light system may include two stages of optical concentration with intermediate removal of infrared radiation between the optical concentration stages. A second stage of optical concentration may prepare multiple concentrating beams of processed solar radiation with visible light with each such concentrating beam directed to a different corresponding light conduit for transmission to an interior space for interior lighting. System modularization may provide flexibility to accommodate a variety of interior lighting applications.

22 Claims, 22 Drawing Sheets

(51) Int. Cl.
    *G02B 6/42*     (2006.01)
    *F21V 8/00*     (2006.01)

(52) U.S. Cl.
    CPC ......... *G02B 6/0001* (2013.01); *G02B 6/0008* (2013.01); *G02B 6/4298* (2013.01); *G02B 17/08* (2013.01); *Y02E 10/52* (2013.01)

(56) References Cited

U.S. PATENT DOCUMENTS

| | | | | |
|---|---|---|---|---|
| 5,222,180 | A * | 6/1993 | Kuder | G02B 6/04 385/115 |
| 5,436,805 | A * | 7/1995 | Hsu | G02B 6/0006 362/294 |
| 6,603,069 | B1 | 8/2003 | Muhs et al. | |
| 6,654,528 | B2 * | 11/2003 | Rosenast | G02B 6/04 385/115 |
| 7,231,128 | B2 | 6/2007 | Muhs et al. | |
| 7,973,235 | B2 | 7/2011 | Muhs et al. | |
| 8,184,372 | B1 | 5/2012 | Gu | |
| 8,426,790 | B2 | 4/2013 | Cruz | |
| 8,459,851 | B2 * | 6/2013 | Wemmer | F21S 11/00 362/183 |
| 8,491,138 | B2 * | 7/2013 | O | G02B 17/006 359/855 |
| 8,730,578 | B1 * | 5/2014 | Heo | G02B 19/0042 359/591 |
| 8,809,677 | B1 | 8/2014 | Kuo | |
| 8,831,392 | B2 * | 9/2014 | Fukui | C09K 11/7706 385/129 |
| 2004/0187907 | A1 | 9/2004 | Morgal | |
| 2007/0157924 | A1 | 7/2007 | Duston et al. | |
| 2008/0087274 | A1 | 4/2008 | Chen | |
| 2012/0243836 | A1 | 9/2012 | Kim | |
| 2012/0257278 | A1 | 10/2012 | Simonov et al. | |
| 2012/0298181 | A1 | 11/2012 | Cashion et al. | |
| 2015/0083221 | A1 | 3/2015 | Boonekamp et al. | |

FOREIGN PATENT DOCUMENTS

| | | |
|---|---|---|
| KR | 20020044298 A | 6/2002 |
| WO | 2014036406 A1 | 3/2014 |

OTHER PUBLICATIONS

Maxey, L. Curt et al.; "Hybrid Solar Lighting: Final Technical Report and Results of Field Trial Program"; ORNL/TM-2008/150; Oak Ridge national Laboratory; Sep. 2008; 91 pages.

Minkel, J.R.; Photography by Toledano, Phillip; "Let the Sun Shine in: A Novel Idea for Piping in Sunlight Where Dreary Fluorescent Bulbs Have Long Dominated"; Discover; vol. 25, No. 7; Jul. 2004; 3 pages.

* cited by examiner

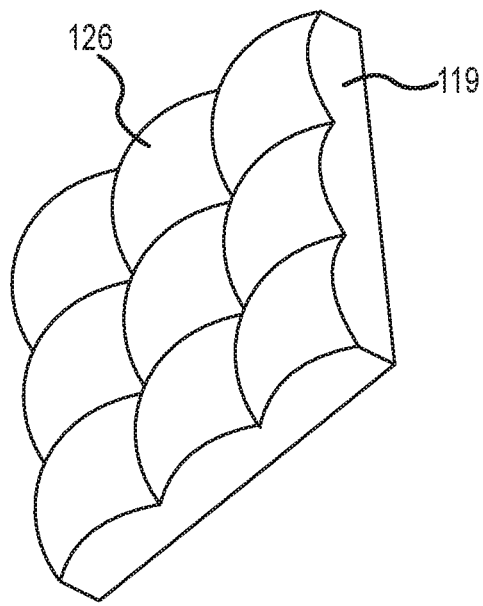
FIG.11
FIG.12

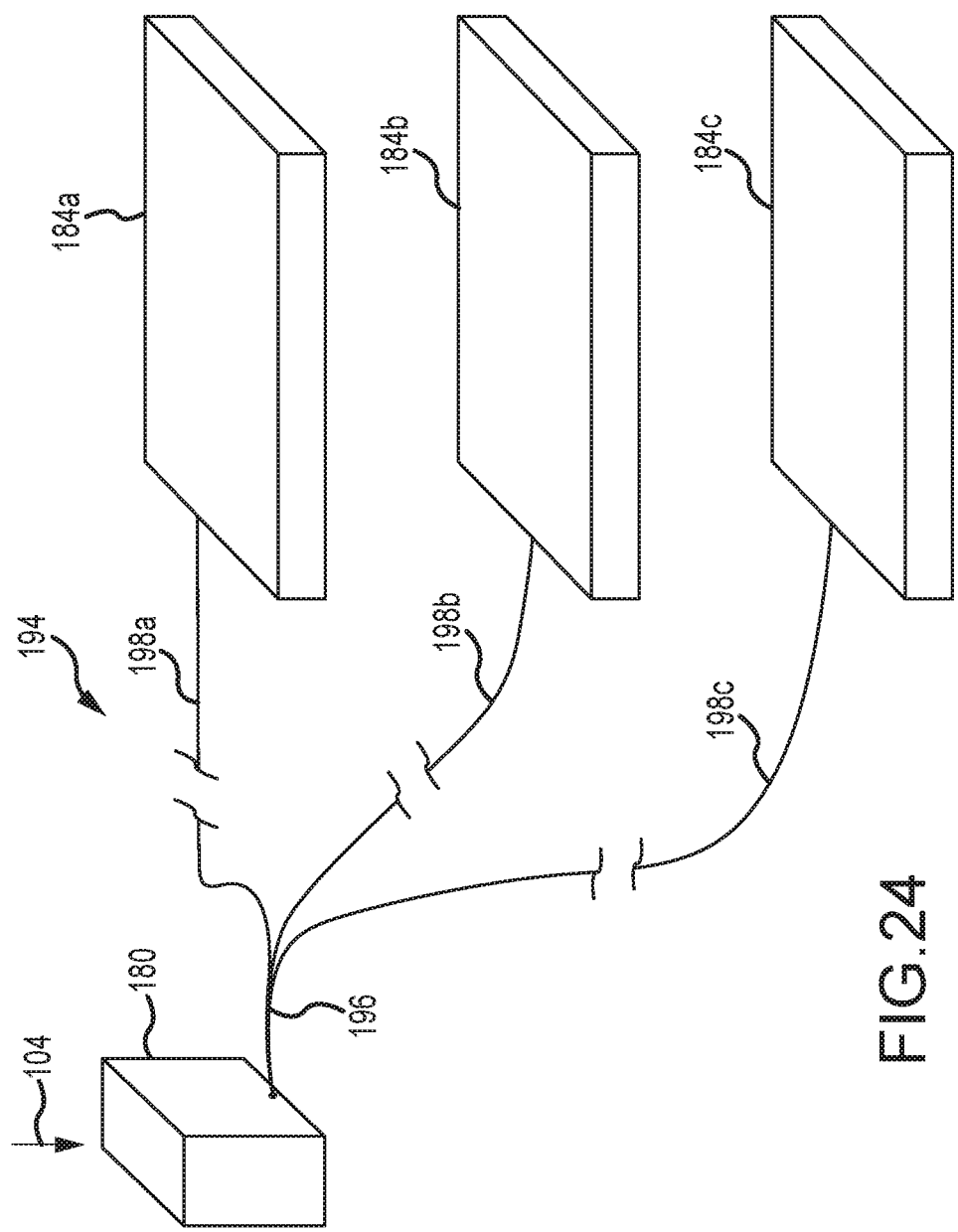

SOLAR LIGHT SYSTEMS, AND RELATED COMPONENTS AND METHODS

CROSS-REFERENCE TO RELATED APPLICATIONS

This application claims a benefit of U.S. provisional patent application 62/188,134 entitled "SOLAR LIGHT SYSTEMS, AND RELATED COMPONENTS AND METHODS", filed Jul. 2, 2015, each and every portion of which is incorporated herein by reference.

FEDERALLY-SPONSORED RESEARCH OR DEVELOPMENT

This invention was made with Government support under grant award number DE-SC0010115 awarded by the Department of Energy. The Government has certain rights in this invention.

FIELD

This disclosure relates to solar light systems and methods involving preparation of processed solar radiation with highly concentrated, solar-sourced visible light, for use in solar interior daylighting and other applications.

BACKGROUND

Electrical lighting represents about 20% of electricity use in the United States, including electrical power consumed for light generation and for space-cooling to accommodate light bulb heat gains from lighting inefficiencies, with commercial buildings using more interior space lighting than all other sectors combined. A great majority of interior space lighting in commercial buildings occurs during daylight hours, and the potential for using solar interior lighting for such applications has long been recognized. One approach for solar interior lighting is the use of sky lights, essentially windows in a roof. That approach, however, requires direct solar collection into the space to be lighted, essentially limiting the technique to single-story buildings. A second approach is to collect solar light and conduct the light to an interior space where the light is needed. Light wells and internally-reflective light ducts represent simple light conduction techniques, but are challenging to route, consume large volumes of building space and interfere with building architecture. Attempts have been made to concentrate collected solar light by several hundred times or more and transmit the concentrated light to interior spaces in optical fibers. One approach has been to concentrate the light using a concentrating mirror and feed the concentrated light into optical fibers. A significant problem with such an approach is the potential for significant heat generation in equipment used to concentrate the light and to direct the concentrated light into the optical fibers, and especially due to the infrared radiation component of collected solar light.

A technique stemming from work at Oak Ridge National Laboratories reduces thermal problems by removing infrared radiation from the concentrated light prior to introduction of the concentrated light into the optical fibers. This technique significantly improves thermal performance, but even with the removal of a great majority of the infrared radiation, it has proved difficult to provide systems that provide highly concentrated solar radiation for interior lighting applications at reasonable cost. Potential for component overheating remains a significant problem that has been addressed to different degrees through the use of expensive equipment (e.g., through use of extremely precise solar trackers and/or high-cost glass optical fibers) to operate at very high light concentration factors of 1000 or more or through operation at much lower light concentration factors but using lower-cost components (e.g., using less precise solar trackers and/or plastic optical fibers) and installed systems tend to be highly customized for each specific application and not easily adapted to other situations. Practical, robust, cost-effective solar interior lighting solutions applicable for a wide variety of interior lighting situations remain elusive.

SUMMARY

Solar interior daylighting is disclosed using processed solar radiation including highly concentrated visible light, which may be concentrated for example by a factor of 1000 times or more relative to incident solar radiation. The highly concentrated, processed solar radiation may be transmitted to interior space through optical conduits, for example optical fibers. Solar radiation processing may include at least two stages of optical concentration with spectral conditioning between the concentration stages to remove infrared radiation, and/or other radiation outside of the visible light range, and with the second stage of optical concentration using a plurality of optical concentrating elements in a parallel light-processing arrangement to further concentrate different spatial portions of the first-stage concentrated light following the spectral conditioning. Each of the optical concentrating elements may correspond with a separate light conduit of a plurality of light conduits corresponding with the plurality of second-stage optical concentrating elements. The technique may permit very high factors of visible light concentration with reduced problems due to heat generation while using less-expensive components such as plastic optical fibers and/or less precise solar tracking systems, and the technique is conducive to modularized system design for flexibility to accommodate various solar interior daylighting situations.

Various aspects of this disclosure relate to solar light systems that may provide processed solar radiation including concentrated visible light that may be delivered to one or more light conduits for conduction to a location for use in a desired application. The application may be an application to light a space with visible light (e.g., solar interior lighting) or may be another application for the visible light (e.g., as a heat or energy source). A solar interior lighting application may include conducting processed solar radiation to an interior space for interior lighting, such as for emission from one or more luminaires into the interior space. The processed solar radiation may include highly concentrated visible light relative to incident solar radiation. Other aspects of this disclosure relate to solar radiation collection and processing systems that may be used to prepare such processed solar radiation, which solar radiation collection and processing system may be or be a part of or may be used in in such solar light systems. Still other aspects of this disclosure relate to methods that may include preparation, conduction and use of processed solar radiation for interior space lighting or another application using visible light.

For convenience of reference, the terms "solar-sourced radiation" and "solar radiation" are used interchangeably herein as a general terms to refer to incident solar radiation initially collected for optical processing and to resulting processed radiation at any stage of optical processing performed on radiation originating from the collected incident solar radiation. The term "processed solar radiation" is used herein as a more specific term to refer to such solar-sourced radiation that is a result of optical processing that includes at least spectral conditioning to remove at least a portion of radiation outside of the visible light range and concentration of at least a portion of radiation in the visible light range. Relative to incident solar radiation, processed solar radiation is deficient in at least a portion of the solar spectrum outside of the visible light range and includes a visible light portion that is more concentrated (has a higher intensity).

In a first exemplary aspect, a solar light system, which may be for interior lighting or another application using visible light, includes a solar radiation collection and processing system to receive incident solar radiation during daylight hours and to process the incident solar radiation to prepare and provide processed solar radiation including concentrated visible light. The collection and processing system includes an optical filter to remove at least a portion of radiation outside of the visible light range to prepare spectrally-conditioned solar radiation including visible light. The collection and processing system also includes a parallel-processing optical concentrator disposed to receive as input at least a portion of the spectrally-conditioned solar radiation and to prepare multiple beams of processed solar radiation including concentrated visible light. The parallel-processing optical concentrator includes at least one parallel-processing array with a plurality of optical concentrating elements in a parallel processing arrangement to receive and concentrate different spatial portions of solar-sourced radiation input to the parallel-processing array.

In a second exemplary aspect, a modularized solar light system for interior lighting may include:

a solar radiation collection and processing module disposed to receive and optically process incident solar radiation during daylight hours to prepare a solar-sourced radiation output including concentrated visible light, the collection and processing module including optical components to prepare the solar-sourced radiation, the optical components including an optical filter to remove at least a portion of solar radiation outside of the visible light range to prepare spectrally-conditioned solar radiation;

a light transmission module in optical communication with the collection and processing module and including a plurality of light conduits to receive and transmit at least a portion of the processed solar radiation;

a luminaire module in optical communication with one or more of the light conduits of the light transmission module to receive and emit solar-sourced radiation including visible light into an interior space for interior lighting; and a solar radiation collection and processing system comprising the optical filter and a parallel-processing optical concentrator on an optical path downstream of the optical filter to prepare a plurality of separate light beams of processed solar radiation including concentrated visible light, each said light beam being directed to a different one of the light conduits for transmission through the light conduits, wherein optical componentry of the parallel-processing optical concentrator is in a portion of the modularized solar light system selected from the group consisting of the solar radiation collection and processing module, the light transmission module and a combination of the solar radiation collection and processing module and the light transmission module.

The collection and processing module may have a light delivery connection structure, the luminaire module may have a light receiving connection structure and the light transmission module may have first end and second end connection structures. The first end connection structure may be engageable with the light delivery connection structure to optically couple the collection and processing module with the light transmission module to provide at least a portion of the solar-sourced radiation output from the collection and processing module to the light transmission module. The second end connection structure may be engageable with the light receiving connection structure to optically couple the light transmission module with the luminaire module to provide some or all visible light solar-sourced radiation output from the light transmission module to the luminaire module.

In a third exemplary aspect, a modularized solar light system may include a plurality of solar radiation collection and processing units each disposed to receive incident solar radiation and each including a separate solar radiation collection and processing system to optically process incident solar radiation during daylight hours to prepare processed solar radiation including concentrated visible light, which may be used for interior lighting or another use, with each collection and processing unit including an optical filter, to remove at least a portion of radiation outside of the visible light range to prepare spectrally-conditioned solar radiation, and an optical concentrator. Each collection and processing unit may be optically connected with a different plurality of light conduits to receive at least a portion of the processed solar radiation from the corresponding collection and processing unit. The plurality of collection and processing units may be two-axis adjustably mounted on a mechanical support structure for two-axis solar tracking, with the plurality of collection and processing units being mechanically interconnected with a single solar tracking mechanical actuation system to actuate adjustment of positioning of the plurality of collection and processing unit in unison by the mechanical actuation system for two-axis solar tracking of the plurality of collection and processing modules. As will be appreciated, a single solar tracking mechanical actuation system for two-axis solar tracking may include separate mechanical drivers (e.g., motors) to impart movement to adjust for tracking each of the two axes (i.e., a mechanical driver to impart movement to track azimuth and a separate mechanical driver to impart movement to track altitude).

In a fourth exemplary aspect, a method for solar light processing may include optically processing incident solar radiation to prepare processed solar radiation including concentrated visible light and transmitting at least a portion of the processed solar radiation to a location for use, for example to an interior space to illuminate the interior space or for other use involving visible light. The optically processing may include removing at least a portion of solar radiation outside of the visible light range to prepare spectrally-conditioned solar radiation and concentrating at least a portion of the spectrally-conditioned solar radiation through a parallel-processing optical concentrator to prepare multiple light beams of processed solar radiation including concentrated visible light, the parallel-processing optical concentrator having a parallel-processing array with a plurality of optical concentrating elements in a parallel-processing arrangement to concentrate different spatial portions of solar radiation input to the parallel-processing array.

A number of feature refinements and additional features are applicable to the various aspects of the disclosure and portions thereof. These feature refinements and additional features may be used individually or in any combination. As such, each of the following features, or other features, may be, but are not required to be, used with any other feature or combination of any of the first through fourth exemplary aspects or any other aspect of this disclosure.

By solar light system, it is meant a system that collects incident solar radiation and processes the collected incident solar radiation to prepare processed solar radiation including concentrated visible light. References below to a "system" include a solar light system, which may be a solar interior lighting system, and a solar radiation collection and processing system, which may be or be a part of a solar light system, unless expressly stated otherwise or the context indicates otherwise. In some exemplary implementations that include at least two stages of optical concentration, a parallel-processing optical concentrator may be referred to as a second stage optical concentrator, even though there may be two or more optical concentrating stages prior to the parallel-processing optical concentrator. Identification of an optical concentrator or optical concentration stage as a numbered stage (e.g., as a first stage or second stage) indicates only relative positioning of such stages in a solar radiation processing system or operation, that is for example a referenced first stage, is upstream along an optical processing path relative to a referenced second stage. However, such relative positioning does not preclude the presence of additional concentration stages before, between or after the referenced stages. For example, additional stages of optical concentration may be included before a referenced first stage, between the first and second stages and/or after the second stage.

One or more light conduits may be disposed to each receive at least a portion of the processed solar radiation for transmission to a location for use, for example to an interior space for lighting or another use. A solar light system may include a plurality of light conduits corresponding with a plurality of optical concentrating elements of a parallel-processing array of a parallel-processing optical concentrator and disposed so that each of a plurality of light beams is directed to a different one of the light conduits.

A solar radiation collection and processing system may include a first stage optical concentrator disposed to receive and concentrate at least a portion of incident solar radiation to form first concentrated solar radiation, and the optical filter may be disposed to receive at least a portion of the first concentrated solar radiation to prepare spectrally-conditioned solar radiation including visible light. A first stage of optical concentration may concentrate incident solar radiation and may prepare concentrated solar radiation including a full solar spectrum. A first stage optical concentrator may be provided by or include a concentrating mirror, a concentrating lens (which may be a Fresnel lens) or other optical concentrating componentry. The first stage optical concentrator may include a single optical concentrating operation or may include multiple optical concentrating operations in series, with or without intermediate optical processing operations. In some preferred implementations, such a first stage optical concentrator may be or include a concentrating mirror that is an asymmetric mirror, for example an off-axis parabolic mirror. In other preferred implementations, a first stage optical concentrator may be or include a Fresnel lens, which may include spherical and/or aspherical lens portions. A first stage optical concentrator may concentrate radiation in a manner to increase intensity of the radiation by a factor of at least 50, at least 100, at least 200, at least 300, at least 500 or at least 900 and often by no more than 3,500, no more than 2,000, no more than 1,000, no more than 700, no more than 500, no more than 400 or no more than 300. Such a concentration factor for an optical concentration stage may apply to some or all spectral portions of the radiation input to the optical concentrator of that stage, for example to visible light of such radiation input. By a factor of concentration, it is meant intensity of the concentrated radiation or a spectral portion thereof compared to the intensity of the feed radiation (e.g., incident solar radiation for a first stage of optical concentration) or a corresponding portion thereof (e.g., visible light portion). As will be appreciated, such a factor of concentration of radiation intensity will be larger than a linear measure of a reduction of cross-dimension (e.g., diameter) of the reduced area of the concentrated radiation. For example, concentrating radiation to a circular spatial area having a diameter that is one-tenth the diameter of an initial circular spatial area prior to concentration will result in an intensity increase by a factor of 100. In some preferred implementations, such a first stage of optical concentration retains essentially all of the spectrum of the input radiation in the output concentrated radiation, however in some other implementations, a first stage or other stage of optical concentration may be combined with an optical filtration step to remove some portion of the input radiation. An example might be, for example, a dichroic mirror that permits some radiation to be filtered out to pass through while reflected radiation is concentrated.

By an optical concentrator, it is meant an optical processing unit with one or more optical concentrating elements, and which may also include one or more other optical elements. An optical concentrating element is one that causes, or causes an increase in a rate of, radiation beam convergence relative to inlet radiation to the optical element, for example concentrating lenses and light funnels (e.g., tapered waveguides). A planar mirror, for example, does not cause, or cause an increase in a rate of convergence of an incident light beam, and is not a concentrating optical element, as even a converging incident light beam continues to converge only at the same rate following reflection.

A parallel-processing optical concentrator (e.g., second stage optical concentrator) may increase an intensity of solar-sourced radiation that is processed through the second stage optical concentrator by a factor of at least 2, at least 5, at least 7, at least 10, at least 25 or even at least 50, and often by a factor of no more than 500, no more than 200, no more than 100, no more than 50, no more than 25 or no more than 15. The parallel-processing optical concentrator may include at least one parallel-processing array with a plurality of optical concentrating elements in a parallel light-processing arrangement to receive and concentrate different portions of input solar-sourced radiation fed to the parallel-processing optical concentrator. The plurality of optical concentrating elements in a parallel-processing array may correspond with a plurality of said light conduits, with concentrated radiation output from an optical concentrating element being directed to a single corresponding light conduit. Such an optical concentrating element may increase intensity of radiation or portion a thereof (e.g., visible light portion) processed by the optical concentrating element by a factor as noted above for the second stage optical concentrator. Each such optical concentrating element (e.g., concentrating lens) of a parallel-processing optical concentrator may be spaced an appropriate distance from a proximal end of a corresponding light conduit for effective receipt of most and preferably essentially all concentrated radiation output from that optical concentrating element. Such spacing between optical concentrating elements (e.g. concentrating lenses) of at least one parallel-processing array and corresponding said light conduits may in some preferred implementations be at a spacing distance of at least 0.5 millimeter, 1 millimeter, 3 millimeters or 5 millimeters, and in some implementations at a spacing distance not greater than 25 millimeters, 15 millimeters or 10 millimeters. In some implementations, there may be no spacing between optical concentrating elements of a parallel-processing array and the corresponding light conduits. For example, in the case of tapered waveguide as an optical concentrating element, the tapered distal end of the tapered waveguide may be positioned flush with a proximal end of the corresponding light conduit. For example, such a distal end of a tapered waveguide may abut and be adhered to a proximal end of the corresponding light conduit using an optically-conductive adhesive that facilitates coupling light from the tapered wave guide into the light conduit. In some implementations, an intermediate optical element may be disposed between an optical concentrating element and a corresponding proximal end of a light conduit that ultimately receives concentrated radiation, for example to further concentrate and/or to assist in capturing the concentrated radiation for delivery into the proximal end of the light conduit. In some implementations, an optical element may be disposed in front of an intermediate optical concentrating element, for example, to provide for a preliminary concentrating operation of the second optical concentrator and/or to assist in effectively delivering spectrally-conditioned solar radiation to the optical concentrating elements of a parallel-processing array. One example of such an intermediate optical component is an optical component, for example a lens, positioned to help correct for light aberration disposed in the optical path to an optical concentrating element or in the optical path between an optical concentrating element and a corresponding proximal end of a light conduit, to increase light delivery of a light beam to the optical concentrating element or to the corresponding light conduit, is the case may be. Such an intermediate optical component may be or may function similar to a field lens. Such an intermediate optical component to help correct for light aberration may at times be referred to herein as an aberration-correcting optical component (e.g., aberration-correcting lens). An array of such aberration correcting optical components may constitute a parallel-processing array of the parallel-processing optical concentrator. A parallel-processing optical concentrator may correspond with any number of light conduits, and a parallel-processing array may include any number of optical concentrating elements. In some preferred implementations, a parallel-processing array may include a number of optical concentrating elements in a range having a lower limit of 4, 9, 16 or 25 and an upper limit of 100, 64, 49, 36 or 25 (provided the upper limit is larger than the lower limit), and may likewise correspond with a number of light conduits also in such a range. A system may include a plurality of parallel-processing optical concentrators, each including at least one parallel-processing array with a plurality of optical concentrating elements corresponding with a different plurality of light conduits.

In some implementations, a parallel-processing optical concentrator may include a plurality (two or more) parallel-processing arrays arranged for series processing to prepare final derived light beams of concentrated radiation to be directed to corresponding light conduits. Each parallel-processing array includes a plurality of optical concentrating elements, with optical concentration elements of a downstream parallel-processing array receiving solar-sourced concentrated radiation from optical concentrating elements of an upstream parallel-processing array. The different parallel-processing arrays need not contain the same number or types of optical concentrating elements. In some preferred implementations a last-in-series parallel-processing array of multiple parallel-processing arrays in series in a parallel-processing optical concentrator has a plurality of optical concentrating elements corresponding in number with a plurality of light conduits. Moreover, optical componentry may be disposed in an optical path between parallel-processing arrays to condition or modify solar-sourced radiation output of one such parallel-processing array prior to receipt by the next parallel-processing array in series (e.g., spectral conditioning, collimation, etc.). When aberration-correcting optical components are disposed in front of proximal ends of light conduits, or in front of optical concentrating elements of a parallel processing array, such aberration-correcting optical components may themselves be considered a parallel-processing array of a parallel-processing optical concentrator (e.g., field lenses or similar-acting lenses). The concentration factors disclosed above for a parallel-processing optical concentrator may apply to the total magnitude of concentration of solar-sourced radiation, or portion thereof (e.g., visible light portion), across all of the parallel-processing arrays in series of a parallel-processing optical concentrator or across any one or any subset of the parallel-processing arrays. Preferably, at least one parallel-processing array concentrates at a concentrating factor within a range of the concentration factors disclosed above for a parallel-processing optical concentrator.

Each optical concentrating element of at least one parallel-processing array may in some implementations have an aperture, to receive input radiation for processing, with a maximum cross dimension in the range having a lower limit of 0.5 millimeter, 1 millimeter, 5 millimeters or 10 millimeters and upper limit of 25 millimeters, 15 millimeters or 12.5 millimeters. All such optical concentrating elements of a parallel-processing array may be of the same design or one or more of the optical concentrating elements may be of different design. In some preferred implementations, all such optical concentrating elements of a parallel-processing array are essentially the same design of optical componentry. Such an optical concentrating element may be an optical concentrating lens. Such an optical concentrating lens may be a lenslet (small-area lens) in an array including multiple such lenslets with fixed relative positioning. Optical concentrating elements of a parallel-processing array may be in a single fabricated piece of material, for example a lens material. Such a material may be, for example, a glass material or a plastic material. Some example plastic materials include polycarbonates, acrylic plastics (e.g., PMMA), cyclic olefin polymers (COP) and cyclic olefin copolymers (COC). Such a single fabricated piece of plastic lens material may be a single molded plastic piece, which may or may not have been subjected to post-molding polishing or other refinement processing. Such an optical concentrating element may be a light funnel. A 'light funnel' may be described as an optically conductive, tapered structure with both entrance and output ports of different aperture areas, whereby propagation through the structure imposes an optical concentration as it passes through. Such a structure may be constructed by standard mechanisms of reflective boundaries, Total Internal Reflection (TIR), plus combinations therein in addition to standard refractive concentrating members (such as lenses, gradient index structures, etc.). Some examples of a light funnel include a tapered optical conductor (e.g., tapered optical fiber) or a material with gradient-index optics that concentrate light in the material in the direction of light travel. By a tapered optical conduit, it is meant that the cross-section of the conduit available for light transmittance is decreasing in size (e.g., decreasing diameter for circular optical fiber) in a direction of light travel. Such tapered optical conductors are sometimes referred to herein as tapered waveguides. By a light beam, or beam of light, it is meant a directional projection of solar-sourced radiation including visible light, regardless of transmission medium (e.g., air, optically conductive solid or liquid). Each light beam of a plurality of light beams is distinct and spatially separated from other ones of the light beams to permit separate processing or conduction of the radiation within each light beam, for example to permit solar-sourced radiation of each light beam to be delivered to a different light conduit. In some implementations, the optical concentrating elements of a parallel-processing array are closely packed and designed to minimize light aberrations between the optical concentrating elements. Adjacent optical concentrating elements may have a common edge boundary with little discontinuity between the adjacent optical concentrating elements. The optical concentrating elements of an optical concentrator may be retained in a fixed relation by a retaining structure. Such a retaining structure may be provided by a single fabricated piece including the optical concentrating elements or may be provided by a separate structure (e.g., retaining framework) that is not a part of such a fabricated piece. In some preferred implementations, apertures of adjacent ones of such concentrating elements of at least one parallel-processing array are separated by a distance of no more than of 10 millimeters, 5 millimeters, 1 millimeter or 0.5 millimeter.

When a system includes an optical filter, the optical componentry of such an optical filter may be any optical componentry that selectively removes at least some of a spectral portion or portions of the input solar-sourced radiation. An optical filter may remove at least a majority or even essentially all of a spectral portion of input solar-sourced radiation that is being filtered out. In some preferred implementations, an optical filter may remove at least a portion of, and preferably at least a majority of, infrared radiation of the input solar-sourced radiation. In some other implementations, an optical filter may remove, instead of or in addition to removing infrared radiation, at least a portion of, or at least a majority of, ultraviolet radiation of the input solar-sourced radiation. In some preferred implementations, little or no visible light is removed by such an optical filter, as it is typically preferred to retain visible light for use in interior space lighting. As used herein, an optical filter includes an optical component or combination of components that accomplishes a desired removal of at least a portion of a spectral portion or portions of input radiation. For example, an optical filter that removes both infrared radiation and ultraviolet radiation may include a first optical component (e.g., first dichroic mirror) to remove either the infrared radiation or the ultraviolet radiation and may include a second optical component (e.g., second dichroic mirror) that removes the remaining one of the infrared radiation or the ultraviolet radiation. As another example, a single optical component may remove separate infrared and ultraviolet components simultaneously. As used herein, reference to spectrally-conditioned radiation refers to radiation with a spectral content that is different than some reference radiation at an upstream location, for example different than the spectral content of incident solar radiation. For example, output solar-sourced radiation from an optical filter may be spectrally conditioned in that the output solar-sourced radiation lacks at least a portion of the spectral content that was removed during the optical filtration. A spectrally-conditioned radiation may be concentrated in one or more retained spectral portions relative to a prior reference radiation, for example relative to collected incident solar radiation, either because of optical concentration that is performed prior to or concurrent with optical filtration. A collection and processing system may include more than one optical filter. Optical filtering may include optical processing that concentrates or otherwise processes radiation in addition to removing a spectral portion outside of the visible light range, and output solar-sourced radiation from an optical filtering operation may be more concentrated than output from a first stage of optical concentration that may precede the optical filtering operation. In some implementations, a spectrally-conditioned solar radiation may have a visible light intensity relative to incident solar radiation according to any of the factors of concentration listed above for first stage optical concentration.

Some additional features and feature refinements may apply in particular to modularized systems including one or more solar radiation collection and processing modules. A collection and processing module may in some implementations include a collection aperture of at least 50 square centimeters, at least 100 square centimeters (0.01 square meter), at least 250 square centimeters, at least 500 square centimeters, at least 1000 square centimeters, at least 2500 square centimeters, or at least 5000 square centimeters (0.5 square meter), and often that may be no larger than 2 square meters, 1.5 square meters or 1 square meter, which collection aperture sizes may be particularly conducive to modularized systems that may provide a high degree of flexibility for sizing a system to accommodate a variety of different applications of varying size. Although in some preferred implementations all collection and processing modules in a modularized system may be sized with the same collection aperture size, in other implementations modules of varying collection aperture sizes may be used. For example, some collection and processing modules may have a larger aperture size to process solar radiation to feed to a larger number of luminaire modules while other modules may have a smaller collection aperture size to process solar radiation to feed a smaller number of luminaire modules or even to feed only a single luminaire module.

A collection and processing module may include some or all of the optical componentry of a solar radiation collection and processing system, which may for example be or include features according to a collection and processing unit of the first exemplary aspect. A light transmission module may include a plurality of light conduits to receive all of the solar-sourced radiation output from a single collection and processing module. First and second end connection structures of a light transmission module may have the same or different geometries. The same geometries may conveniently be used on the first and second end connection structures for example when a light transmission module does not include optical componentry that is to coordinate with componentry in a collection and processing module or luminaire module in a way that requires specificity of connection orientation or light propagation distributions with the collection and processing module or the luminaire module. Different geometries may be used on the first and second end connection structures for example when interchangeability of connection with the collection and processing module and the luminaire module is not desired, for example because of a particular orientation or light distribution issue between componentry in the light transmission module and the collection and processing module and/or the luminaire module. For example, a light transmission module may include a parallel-processing optical concentrator or portion thereof (e.g., a parallel-processing array) that may necessitate specific orientation of the optical concentrator relative to an optical filter in a collection and processing module. However, if such a parallel-processing optical concentrator or portion thereof is included instead in the collection and processing module, then specific orientation of the first and second end connection structures on the light transmission module might not be needed. In some implementations, a luminaire module may include a single luminaire, and such a single luminaire may be designed to effectively use for interior lighting some or all of the visible light transmitted by a light transmission module that is sourced from a single collection and processing module. Alternatively a luminaire module may include multiple luminaires.

A modularized solar light system may include a plurality of collection and processing modules each connected with a different one light transmission module, each of which light transmission modules may be connected to a single light transmission module. Such a 1:1:1 modularized system facilitates significant flexibility in easily accommodating total system requirements of various sizes by including an appropriate number of such sets of module combinations each including a single collection and processing module, single light transmission module and single luminaire module. In other implementations different ones and/or groups of light conduits may be optically connected with different luminaire modules, so that a single collection and processing module may deliver light to multiple luminaire modules. A light transmission module may have different second end connection structures for the different ones or different groups of light conduits connected with different luminaire modules. A light transmission module may include multiple first end connection structures that separately connect with the collection and processing module to provide separate optical connection for different ones and/or groups of light conduits that are directed to different luminaire modules.

A plurality of the collection and processing modules may advantageously be supported on a common support structure, and may be mechanically interconnected to be movable in unison on the common support structure for efficient, cost effective two-axis solar tracking.

When a modularized solar interior lighting system includes a plurality of solar radiation collection and processing units, each such collection and processing unit may include a complete solar radiation collection and processing system, for example such as according to or including features of a processing and collection system of the first exemplary aspect. A collection and processing unit may be in the form of a collection and processing module, such as summarized above, when such a collection and processing module includes a parallel-processing optical concentrator to prepare separate concentrated portions of processed solar radiation for delivery to a plurality of corresponding light conduits. However, in alternative implementations such a parallel-processing optical concentrator, or some component or components thereof, may be included for example in a light transmission module. A modularized solar light system may include a plurality of collection and processing units with one or more rows of the collection and processing units mounted on a rotatable member for rotation that is rotatable to move the collection and processing units in unison, for example for azimuth tracking or for altitude tracking. In some such implementations, multiple collection and processing units in such a row may each be pivotally connected with the movable member and the multiple collection and processing units in a row may all be mechanically interconnected with all of the collection and processing units of a row being pivotally movable in unison through the mechanical interconnection, which may accomplish the other one of azimuth and altitude tracking not accomplished by rotation of the rotatable member. The moveable members may be pivotally movable relative to an axis. Such pivotal movement may effect repositioning of the collection and processing units, for example by swinging the portions of the movable member on which the collection and processing units are mounted or by rotation of the movable member when the axis of pivot is an axis of rotation of a rotatable member.

With respect to methods for solar light processing, a method, for example according to the fourth exemplary aspect, may include performing any optical processing using capabilities of a solar interior lighting system or solar collection and processing system aspect of any of the first through third exemplary aspects. For example, a method may include a first stage concentrating that may include increasing intensity of at least visible light in solar-sourced radiation being processed by any factor as noted above for a first stage optical concentrator. As another example, a method may include removing at least some, or even at least a majority, of solar infrared radiation and/or some other radiation (e.g., ultraviolet) outside of the visible light range. As yet another example, a method may include optical concentrating using a parallel-processing optical concentrator, which may include increasing an intensity of at least visible light by any factor as noted above for a parallel-processing optical concentrator. Optical concentrating using such a parallel-processing optical concentrator may be a second stage of optical concentration. A method may include optically coupling different beams of processed solar radiation, for example as prepared by an optical concentrating elements of a parallel-processing optical concentrator, to different ones of a plurality of light conduits.

A number of additional features and feature refinements may be applicable to any of the various system and method aspects of the disclosure, including to any of the first through fourth exemplary aspects.

A system or method may include a light conduit disposed, or light conduits each disposed, to receive at least a portion of processed solar radiation. A light conduit may be or include an optical fiber. A light conduit may include multiple lengths of optical fiber interconnected with optical componentry to couple light from one length of optical fiber to a subsequent length of optical fiber to provide an optical conduit of any desired length even if a single length of optical fiber is not used to provide for the entire desired length of the optical conduit. In some implementations, one or more light conduits or portions thereof (e.g., optical fiber) may be made of an optically conductive plastic material. This is particularly beneficial to keep system costs down. Some examples of plastic materials for an optical conduit include acrylic plastics, for example polymethyl methacrylate (PMMA). One or more light conduits or portions thereof (e.g., optical fiber) may be made of a glass material. In some implementations, one or more light conduits may include plastic materials while one or more other light conduits may include glass materials. For example, some glass optical fibers may be used for particularly long runs to an interior space, while plastic optical fibers may be used for shorter runs. In some implementations, light conduits, and in particular optical fibers used for such light conduits, may have a maximum cross-dimension (e.g., diameter for circular cross-section light conduits) in a range having a lower limit of 0.25 millimeter, 0.5 millimeter, 0.75 millimeter or 1 millimeter and an upper limit of 12.5 millimeters, 7 millimeters, 5 millimeters, 3 millimeters, 2 millimeters or 1.5 millimeters. A light conduit may have a length in a range having a lower limit of 2 meters, 3 meters, 5 meters or 7 meters and an upper limit of 150 meters, 100 meters or 10 meters. When a light conduit is of a plastic material, such an upper limit may preferably be no larger than 50 meters, 30 meters, 20 meters or 10 meters.

A system or method may include a plurality of light conduits each disposed to receive at least a different portion of processed solar radiation from a parallel-processing optical concentrator. The light conduits may each have one or more, or even all features, that are the same between them, or one or more of the light conduits may have one or more different features relative to one or more other light conduits. When a method or system includes a plurality of light conduits, proximal ends of the plurality of light conduits may be retained in fixed relation relative to each other by a retaining structure. Such proximal ends of adjacent light conduits of a plurality of light conduits as retained by a retaining structure may in some preferred implementations be separated by a distance of at least 0.5 millimeter, at least 1 millimeter, at least 2 millimeters, at least 5 millimeters, at least 10 millimeters or at least 20 millimeters. Such a separation distance may assist with heat dissipation. Such a separation distance may often be no larger than 50 millimeters no larger than 30 millimeters, no larger than 20 millimeters, no larger than 10 millimeters, no larger than 5 millimeters or no larger than 2 millimeters. In some implementations, a plurality of light conduits corresponding with a parallel-processing optical concentrator may be in optical communication with only a single luminaire, for example to facilitate versatile modularization. In other implementations different ones or different groups of light conduits of a plurality of light conduits corresponding with a parallel-processing optical concentrator may be in optical communication with different ones of a plurality of luminaires.

Processed solar radiation of a system or method may include visible light with an intensity that is many times as large as that of the incident solar radiation. The intensity of visible light in the processed solar radiation may be at a factor of the intensity of visible light in the incident solar radiation that is in a range having a lower limit of 1,000, 2,000, 3,000 or 4,000 and an upper limit of 12,500, 10,000, 8,000, 6,000 or 5,000. Processed solar radiation of a system or method may be spectrally conditioned with at least a portion of solar radiation outside of the visible light spectrum removed, and preferably with at least a portion of or even with at least a majority of solar infrared radiation removed. Such processed solar radiation may be spectrally conditioned with at least a portion or even with at least a majority of solar ultraviolet radiation removed. A system or method may include use of an optical filter prior to a parallel-processing optical concentrator, to remove at least a portion of radiation outside of the visible light range prior to the parallel-processing optical concentrator. Such an optical filter may be operable to remove at least a portion of, or even at least a majority of, solar infrared radiation and/or ultraviolet radiation. A system or method may include use of a photovoltaic electrical power generator that may be powered by solar infrared radiation removed by an optical filter and directed to operate the photovoltaic electrical power generator. An optical filter in some implementations may advantageously be operable to remove at least some or even at least a majority of solar spectrum energy at wavelengths greater than 620 nm. An optical filter may include at least one dichroic mirror, and radiation outside of the visible light range to be removed using the dichroic filter may either be removed by passing such radiation through the dichroic mirror or reflecting such radiation by the dichroic mirror, with removal by passage through a dichroic mirror being preferred for some implementations. Conversely, retained solar-sourced radiation including visible light for interior lighting use, or for other use, may either be passed or reflected by the dichroic mirror, with such visible light being reflected by the dichroic mirror being preferred for some implementations. A dichroic mirror may have a covered surface with optical power to direct collimated radiation including visible light toward a parallel processing optical concentrator, or may be a flat surface with no optical power. In some preferred arrangements, a dichroic mirror may be a flat surface with no optical power in a collimating space between two stages of optical concentration.

Concentrating optical elements with curved surfaces (e.g., concentrating mirrors, concentrating lenses) may have spherical optics, but in preferred implementations have aspheric optics.

Other features, additional features and feature refinements of these and other aspects of this disclosure will be further understood with reference to the drawings and in view of the discussion, example implementation combinations and claims provided below.

BRIEF DESCRIPTION OF THE DRAWINGS

FIGS. 10-12 illustrate an example retaining structure for retaining proximal ends of a plurality of light conduits in fixed relation to receive different portions of processed solar radiation from a spaced parallel-processing optical concentrator.

FIGS. 23 and 24 illustrate example alternative implementations for a modularized solar interior lighting system.

DETAILED DESCRIPTION

Figure 1:
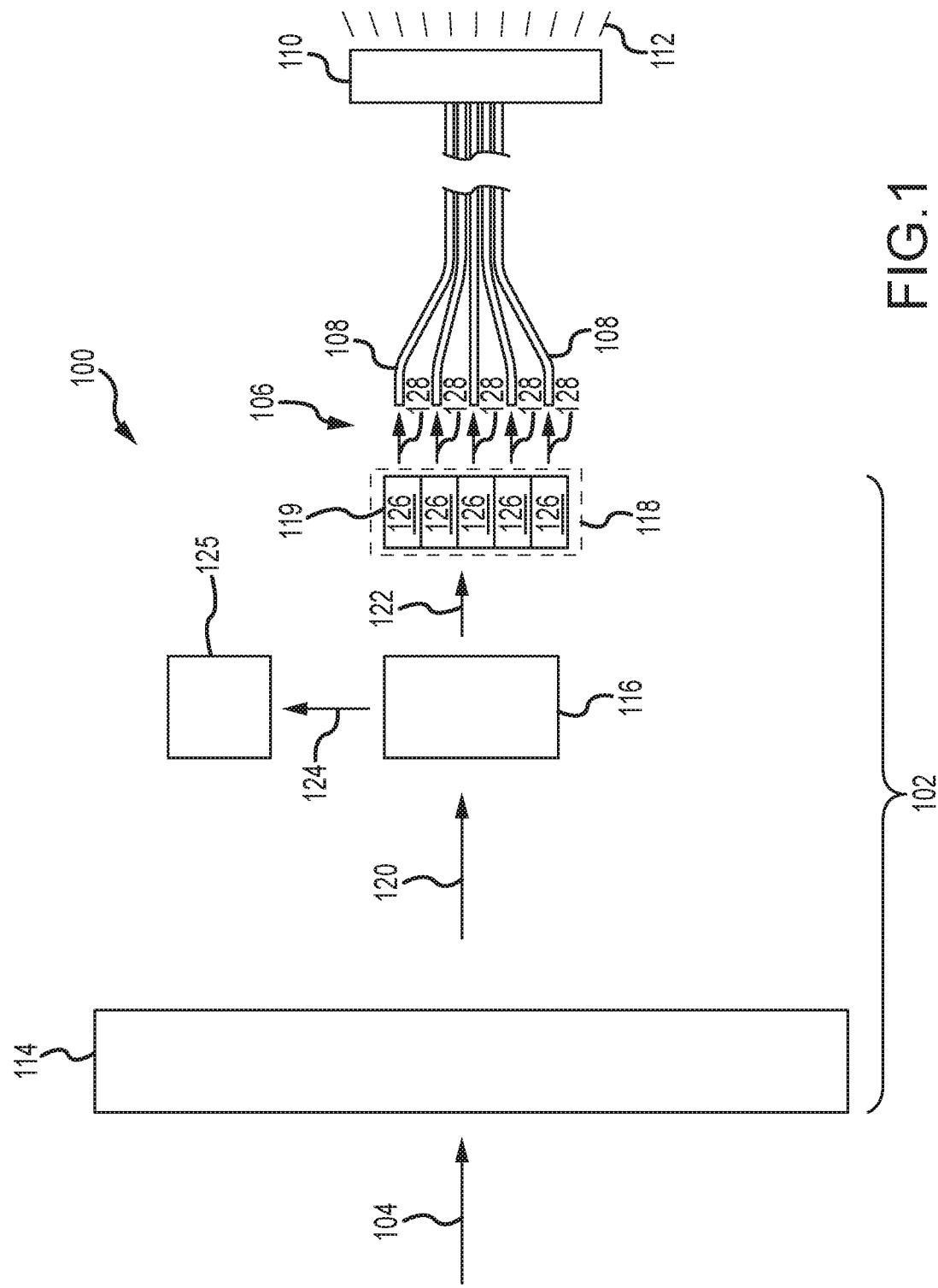
FIG. 1 illustrates an example solar light system used for solar interior lighting.

FIG. 1 illustrates an example solar light system 100 exemplified for use for interior lighting. The solar light system 100 includes a solar radiation collection and processing system 102 to receive incident solar radiation 104 during daylight hours and to process the incident solar radiation to prepare and provide processed solar radiation 106 to a plurality of light conduits 108 that are in optical communication with a luminaire 110 to transmit solar-sourced radiation to the luminaire 110 to provide visible light 112 for interior lighting. The example solar radiation collection and processing system 102 shown in FIG. 1 includes a first optical concentrator 114, an optical filter 116 and a second optical concentrator 118. During daylight hours, the first optical concentrator 114 concentrates the incident solar radiation 104 to prepare concentrated solar radiation 120 that is received and optically processed by the optical filter 116 to remove at least a portion of radiation outside of the visible light range and to prepare spectrally-conditioned solar-sourced radiation 122 (also referred to as spectrally-conditioned solar radiation or spectrally-conditioned radiation). As illustrated in FIG. 1, the optical filter 116 is removing infrared radiation 124, which in the illustration of FIG. 1 is sent to a photovoltaic electrical power generator 125 for use of the infrared radiation 124 to generate electrical power. The spectrally-conditioned solar-sourced radiation 122 has been spectrally conditioned relative to the spectral content of the incident solar radiation 104 through removal of at least a portion of the infrared radiation. In some preferred implementations, most or even substantially all of the infrared portion of solar spectrum is removed by the optical filter 116. Additionally or alternatively radiation other than infrared radiation may be removed by the optical filter 116, for example in the ultraviolet range. The spectrally-conditioned solar-sourced radiation 122 is received and processed by the second optical concentrator 118 to prepare the processed solar radiation 106 in the form of a corresponding plurality of light beams 128 each including a different spatial portion of the processed solar radiation 106. The second optical concentrator 118 is a parallel-processing optical concentrator that includes a parallel-processing array 119 having a plurality of optical concentrating elements 126 arranged in a parallel arrangement to receive and concentrate different spatial portions of the spectrally-conditioned solar radiation 122 to prepare the processed solar radiation 106 in the form of the corresponding plurality of the light beams 128. In the second optical concentrator 118, a beam of the spectrally-conditioned solar-sourced radiation 122 is spatially split into multiple beams each including essentially the same spectrum of light for processing, and each such spatially-split beam is separately and individually concentrated. The light conduits 108 transmit the received solar-sourced radiation to the luminaire 110 which emits solar-sourced radiation including visible light 112 for interior lighting. In the example solar radiation collecting and processing system 102 illustrated in FIG. 1, the first optical concentrator 114 provides first stage optical concentration of incident solar radiation to prepare the solar radiation in an intermediate concentrated form for removal of the infrared radiation 124 and the heat generating potential of the infrared radiation 124 prior to further concentration of the spectrally-conditioned radiation 122 to a higher concentration level in a second stage of optical concentration by the second optical concentrator 118. In this way, the second stage concentration in the second optical concentrator 118 proceeds without the large heat generation capacity of the removed infrared radiation 124. This processing provides several combinative advantages, including permitting the processed solar radiation 106 to be concentrated to an extremely high degree for introduction into closely-spaced light conduits 108 with significant reduction of potential problems from overheating, permitting use of relatively less expensive component (e.g., smaller-area dichroic mirror in the optical filter, plastic optical fibers for light conduits) and permitting enhanced, lower-cost connectability of closely-spaced distal light conduit ends retained in relatively small connector structures. Optical processing units or operations such is the first optical concentrator 114, optical filter 116 and second optical concentrator 118 will include optical componentry directed to performing the optical processing associated with that unit or operation (e.g., optical filtration, optical concentration) and may also include optical componentry directed to performing additional optical processing. Also, optical processing units, and optical processing between units, may overlap. The first stage concentration by the first optical concentrator 114 may concentrate the incident solar radiation 104, including concentration of the visible light portion thereof, by any factor as described above in the Summary section for a first stage optical concentrator, relative to the incident solar radiation 104. The second stage concentration by the second optical concentrator 118 may further concentrate the spectrally-conditioned solar-sourced radiation 122, including the visible light portion thereof, by any factor as described above in the Summary section for a parallel-processing optical concentrator, relative to the spectrally-conditioned solar-sourced radiation 122. The processed solar radiation 106 as delivered to the light conduits 108 in the beams 128 include a visible light portion with an intensity that may be concentrated by any factor relative the corresponding visible light portion of the incident solar radiation 104 as described above in the Summary section for a total concentration factor for processed solar radiation.

The first optical concentrator 114, optical filter 116 and second optical concentrator 118 may each include an optical component or combination of optical components that accomplish the desired optical processing. Such optical components to concentrate may include, for example, mirrors (reflective), lenses (refractive), and/or hybrid lens/mirror (catadioptic) systems. Such optical components to filter may include, for example, spectrally absorptive material, multi-layer coatings, and/or tuned microstructure filters.

Figure 3:
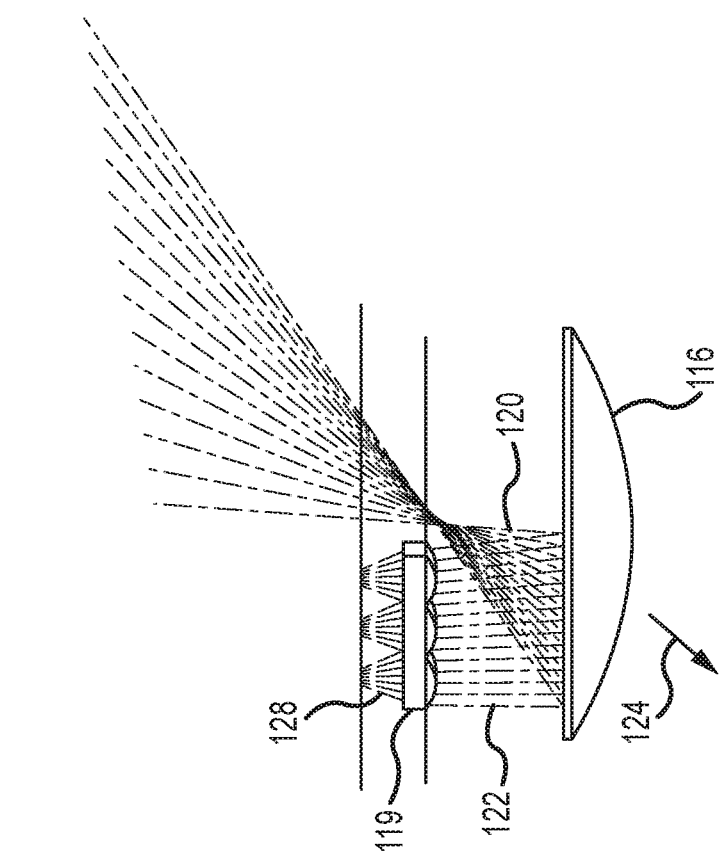
FIGS. 2 and 3 illustrate some example optical componentry and optical processing for a solar radiation collection and processing system.
Figure 2:
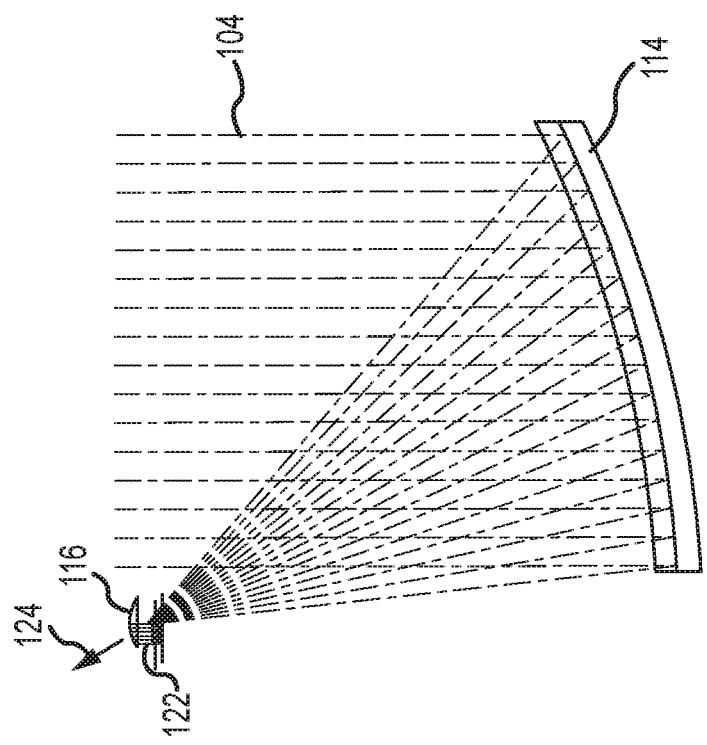

FIGS. 2 and 3 illustrate one example combination of some optical components that may be used for the first stage concentrator 114 and the optical filter 116 of FIG. 1. In the example of FIG. 2, the first optical concentrator 114 is provided in the form of a concentrating mirror that receives the incident solar radiation 104 and reflects and concentrates radiation directed toward the optical filter 116. The example for the optical filter 116 shown in FIG. 2 is provided in the form of a dichroic mirror that passes infrared radiation 124 and reflects and collimates light to provide the spectrally-conditioned solar-sourced radiation 122. FIG. 3 shows an enlarged portion of the illustration of FIG. 2 and better illustrates the concentrated solar radiation 120 from the first optical concentrator 114 directed to the dichroic mirror of the optical filter 116 and reflection of the spectrally-conditioned solar radiation 122 by the dichroic mirror. FIG. 3 also shows in better detail than FIG. 2 receipt of the spectrally-conditioned solar-sourced radiation 122 by the parallel-processing array 119 of the second optical concentrator 118 and the concentrating beams 128 of the processed solar radiation 106 directed toward the light conduits 108, (not shown in FIGS. 2 and 3). Such collimation to prepare the spectrally-conditioned solar-sourced radiation 122 as shown in FIGS. 2 and 3 contributes to the first stage concentration in combination with the first stage optical concentrator 114.

Figure 4:
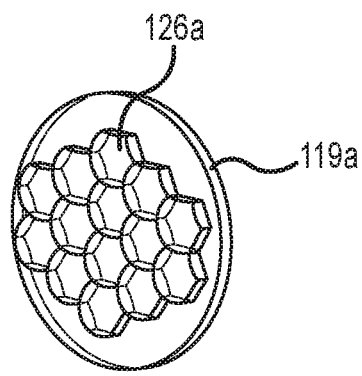
FIGS. 4-7 illustrate some example configurations for a parallel-processing optical concentrator including a plurality of optical concentrating elements in the form of lenslets in a parallel arrangement.
Figure 5:
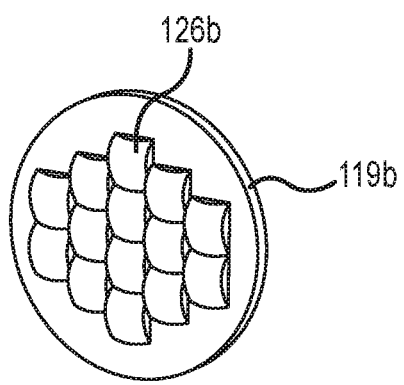
Figure 6:
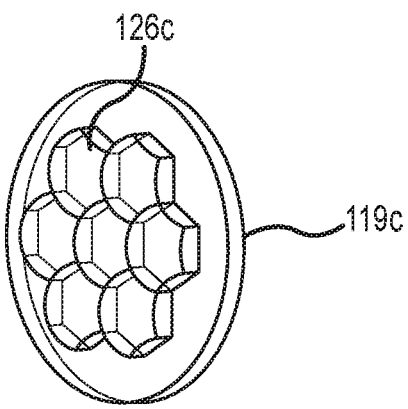
Figure 7:
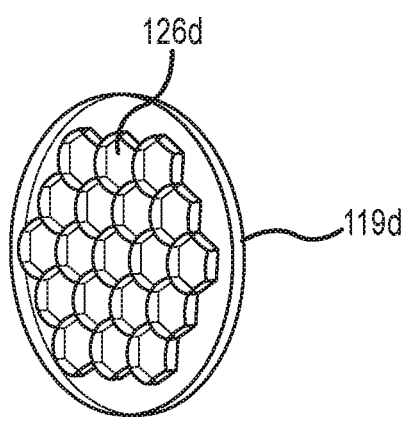

With continued reference to FIGS. 1-3, the parallel-processing array 119 of the second optical concentrator 118 may include the plurality of optical concentrating elements 126 retained in fixed relation relative to each other by a retaining structure, to position and hold the optical concentrating elements 126 in position to receive the intended spatial portions of the spectrally-conditioned solar radiation 122. Such concentrating optical elements 126 may be, for example, in the form of relatively small aperture refractive or reflective optical lenses (e.g., lenslets or lens arrays), light funnels (e.g., total internal reflection waveguide light funnels), gradient-index lenses and/or any combinations thereof. Such optical concentrating elements 126 may be individual components retained in a separate retaining structure or may be in a single structure of which the optical concentrating elements 126 are a part. FIGS. 4-7 show some example implementations for the parallel-processing array 119 of FIGS. 1-3 in the form of single fabricated pieces of lens material (e.g., molded piece of plastic lens material) including a plurality of concentrating optical lenses in the form of a lenslet array. FIG. 4 shows an example parallel-processing array 119a configuration in the form of a single fabricated piece including an array of sixteen optical concentrating elements 126a in the form of hexagonal-shaped lenslets with adjoining boundary edges. FIG. 5 shows an example parallel-processing array 119b configuration in the form of a single fabricated piece including an array of fourteen optical concentrating elements 126b in the form of square-shaped lenslets. FIG. 6 shows an example parallel-processing array 119c configuration in the form of a single fabricated piece including an array of seven example optical concentrating elements 126c in the form of hexagonal-shaped lenslets. FIG. 7 shows an example parallel-processing array 119d configuration in the form of a single fabricated piece including an array of nineteen example optical concentrating elements 126d in the form of hexagonal lenslets. Each of the example parallel-processing arrays 119a-d may for example be made of a single molded piece of optically transparent material (e.g., optically transparent plastic), which may as desired be subjected to post-molding processing (e.g., machining, polishing) to refine optical characteristics if desired.

Figure 8:
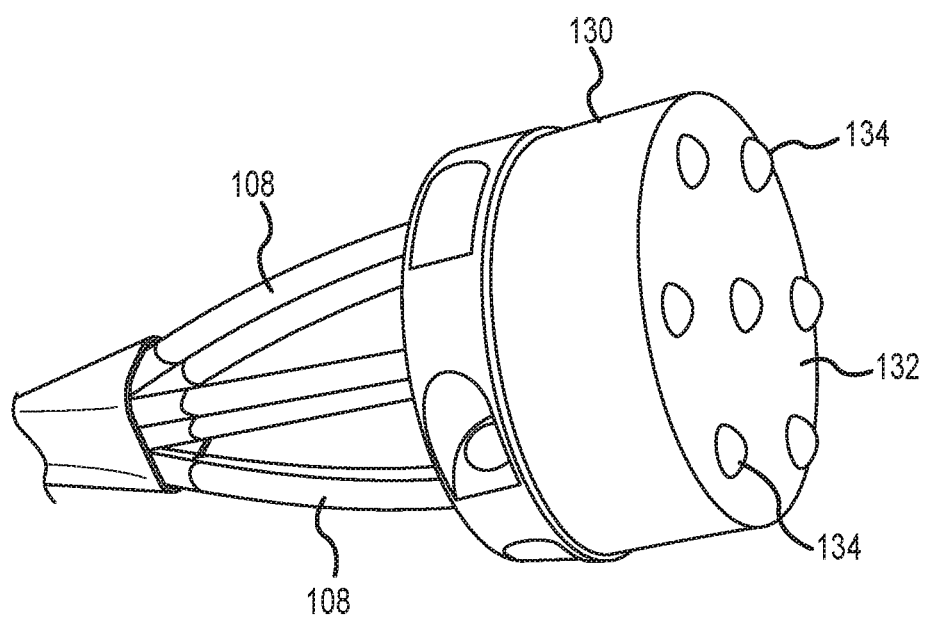
FIG. 8 illustrates an example retaining structure for retaining proximal ends of a plurality of light conduits in fixed relation to receive different portions of processed solar radiation from a parallel-processing optical concentrator.

With continued reference to FIG. 1, proximal ends of the light conduits 108 may be retained in fixed relation relative to each other and positioned for each light conduit 108 to receive a portion of the processed solar radiation 106 of a corresponding light beam 128 by any appropriate retaining structure. FIG. 8 shows one example retaining structure in which example light conduits 108 are shown terminating in and held in place by a head piece 130 such that the proximal ends of the light conduits 108 to be disposed toward the second optical concentrator 118 terminate at or adjacent to a proximal face 132 of the head piece 130 that would be disposed toward the optical concentrator 118 in the solar light system 100. In the example implementation shown in FIG. 8, an aberration-correcting lens 134 (e.g., field lens or similar-functioning lens) is disposed at the proximal face 132 in front of the proximal end of each of the light conduits 108 to assist in collecting all of the processed solar radiation 106 in the beams 128 for communication to the respective light conduits 108. In an alternative embodiment, with precise placement and retention of such a head piece 130 by an appropriate retaining structure and/or with larger-diameter light conduits 108 relative to width of beams 128, the aberration-correcting lenses 134 may be dispensed with and not included, and the processed solar radiation of the beams 128 may be directly received in the proximal ends of the light conduits 108 without an intermediate optical element such as the aberration-correcting lenses 134.

Figure 9:
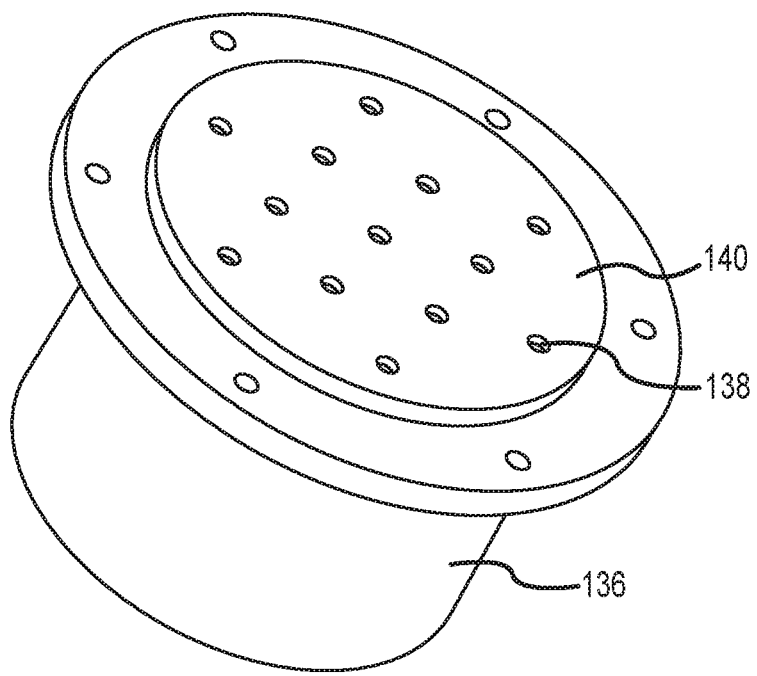
FIG. 9 illustrates another example retaining structure for retaining proximal ends of a plurality of light conduits in fixed relation to receive different portions of processed solar radiation from a parallel-processing optical concentrator.

Reference is now made to FIG. 9 together with FIG. 1. Another example retaining structure is shown in FIG. 9 for retaining light conduits in a fixed relative position to receive processed solar radiation. FIG. 9 shows a light conduit retaining structure 136 with a plurality of retaining holes 138 open at a proximal face 140 that would be disposed toward the parallel-processing array 119 of the second optical concentrator 118 in the solar light system 100 shown in FIG. 1. Proximal end portions of the light conduit 108 may be retained within the retaining holes 138 with the proximal ends of the light conduits 108 terminating at or adjacent to the proximal face 140 to receive radiation of corresponding ones of the concentrating light beams 128.

Figure 10:
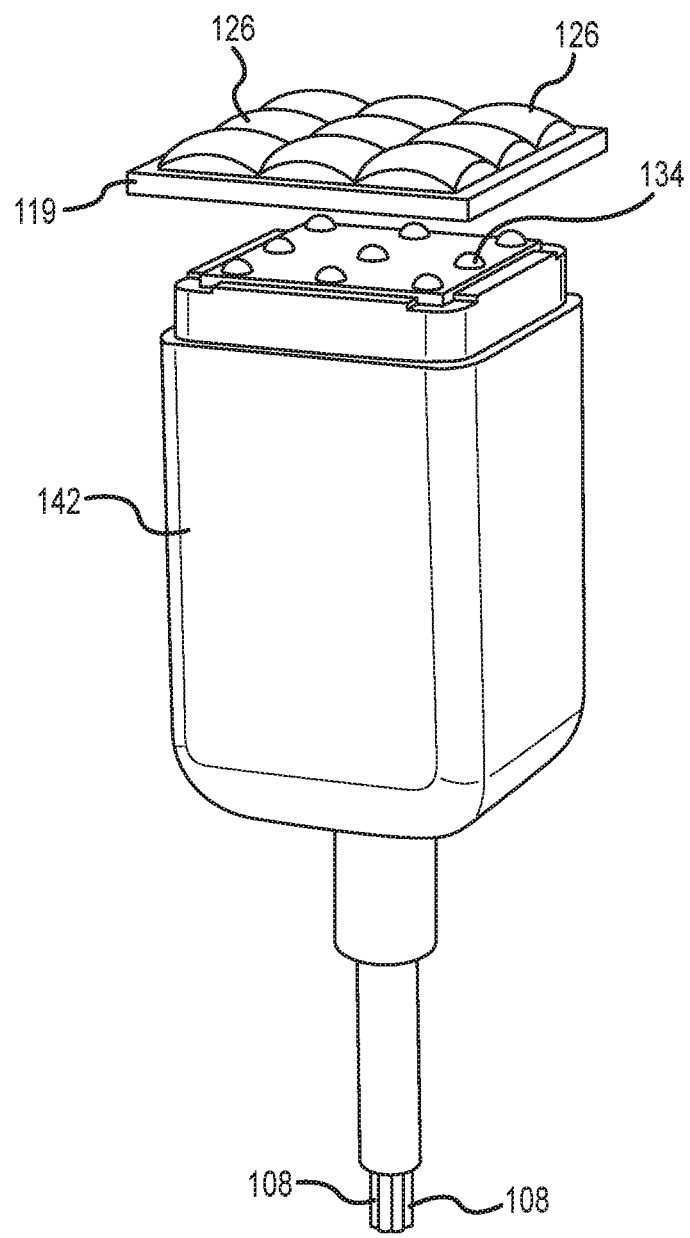

Reference is now made to FIGS. 10-12 together with FIG. 1. FIG. 10 shows another example retaining structure 142 for retaining proximal ends of the light conduits 108 positioned to receive radiation of corresponding ones of the concentrating beams 128. FIG. 10 shows an example configuration for the parallel-processing array 119 of the second optical concentrator 118 including an array of nine of the optical concentrating elements 126 in the form of an array of square-shaped lenslets in a single fabricated piece of lens material. The parallel-processing array 119 is shown in FIG. 10 as positioned in spaced relation to the retaining structure 142 with a desired spacing between the optical concentrator 118 and the retaining structure 142 to provide an appropriate distance between the lenslets of the optical concentrating elements 126 and the corresponding proximal ends of the light conduits 108. In the configuration shown in FIG. 10, the retaining structure 142 includes an aberration-correcting lens 134 corresponding with each light conduit 108, to help facilitate complete delivery of radiation of the beams 128 to the corresponding ones of the light conduits 108. The aberration-correcting lenses 134 also provide some (often small) amount of further optical concentration and may be considered to constitute a second parallel-processing array in series, following the parallel processing array 119, of the second optical concentrator 118. The proximal ends of the light conduits 108 may be disposed within the retaining structure 142 immediately adjacent to the corresponding aberration-correcting lens 134. FIGS. 11 and 12 show an example of the same configuration for the parallel-processing array 119 of the second optical concentrator 118 shown in FIG. 10 and FIG. 12 illustrates the relative size of the beams 128 as input into proximal ends of the light conduits 108. In one enhancement, proximal ends of the light conduit 108 may be retained in a structure with high thermal conductivity, such as a thermally conductive metallic material, to help dissipate heat that may be generated. Cooling fins or other heat transfer structures to assist cooling may also be incorporated if desired.

Figure 29:
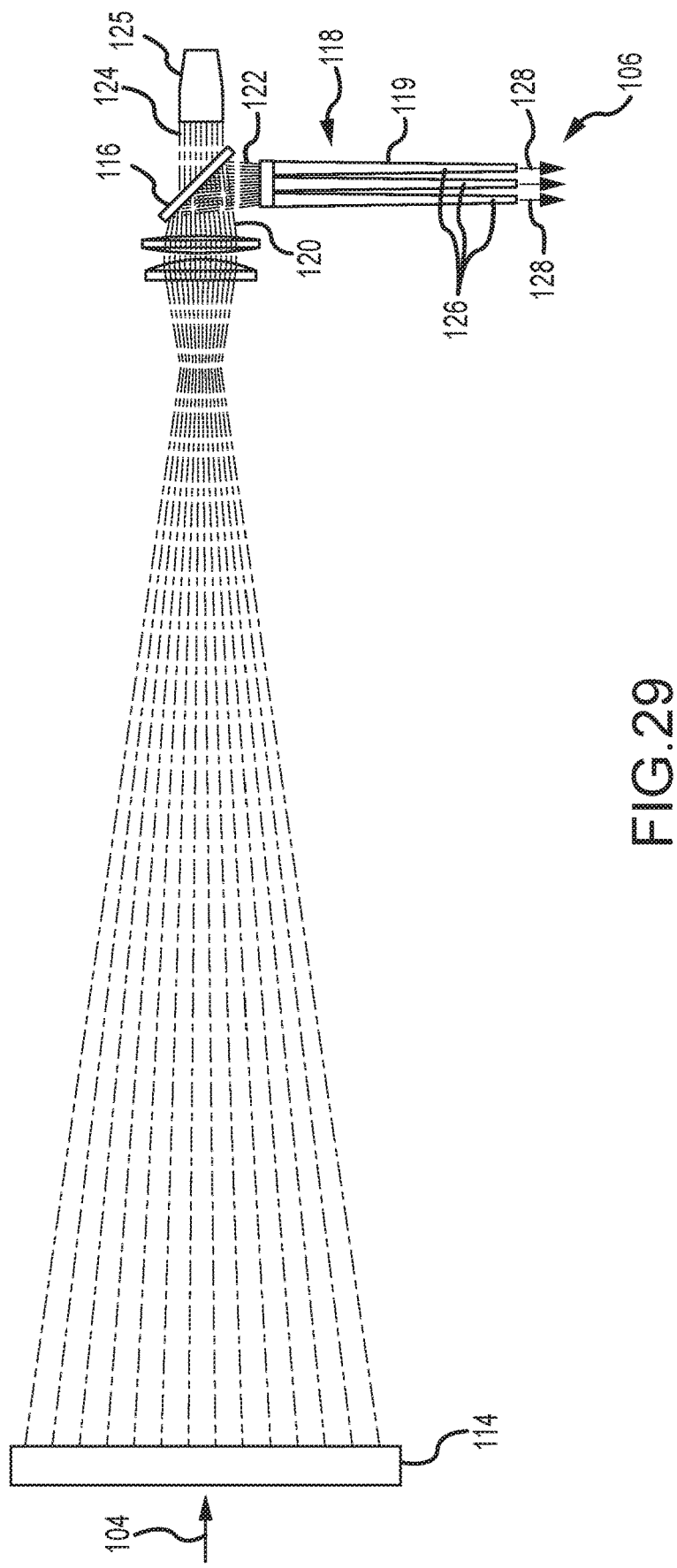
FIG. 29 illustrates an example of some optical componentry and optical processing for a solar light system.

FIG. 29 illustrates another example combination of some optical components that may be used for the example solar light system 100 shown in FIG. 1. As shown in FIG. 29, the first optical concentrator 114 may be provided in the form of a concentrating Fresnel lens that receives and concentrates incident solar radiation 104. Resulting concentrated solar radiation 120 from the first stage of optical concentration is directed to the optical filter 116, shown in the form of a planar dichroic mirror. Intermediate between the optical filter 116 and the Fresnel lens are a pair of lenses 130 to collimate and direct the concentrated solar radiation 120 to the optical filter 116. A dichroic mirror of the optical filter 116 reflects the spectrally-conditioned solar-sourced radiation 122, which is directed toward a second optical concentrator 118 including a parallel-processing array 119 of tapered waveguides as the optical concentrating elements 126 to receive and concentrate different spatial portions of the spectrally-conditioned solar-sourced radiation 122 to prepare the processed solar radiation 106 in the form of the light beams 128. The infrared radiation 124 is directed to a photovoltaic electrical power generator 125. The photovoltaic electrical power generator 125 may include a parallel-processing optical concentrator in which the infrared radiation 124 is spatially split into multiple parallel processed beams that are individually concentrated, and which concentrated beams may then be directed at photovoltaic cells to generate electricity. The parallel-processing optical concentrator of the photovoltaic electrical power generator 125 may have a construction similar to that described in relation to the second optical concentrator 118 including a parallel-processing array of optical concentrating elements similar to those described and shown for use in such a second optical concentrator 118, except configured and used to concentrate different spatial portions of the infrared radiation 124. Different concentrated beams of infrared radiation from such a parallel-processing optical concentrator may directed to different ones of a plurality of separate photovoltaically active regions, for example to separate photovoltaic cells, to generate electricity.

Figure 30:
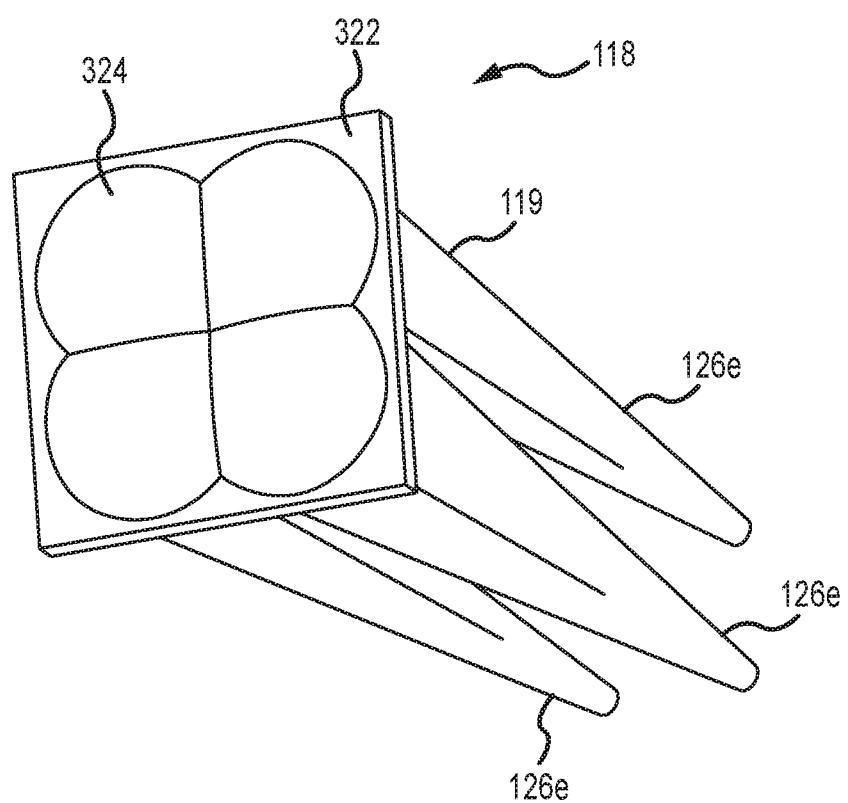
FIGS. 30 and 31 illustrate an example configuration for a parallel-processing optical concentrator including a parallel-processing array of optical concentrating elements in the form of tapered waveguides.
Figure 31:
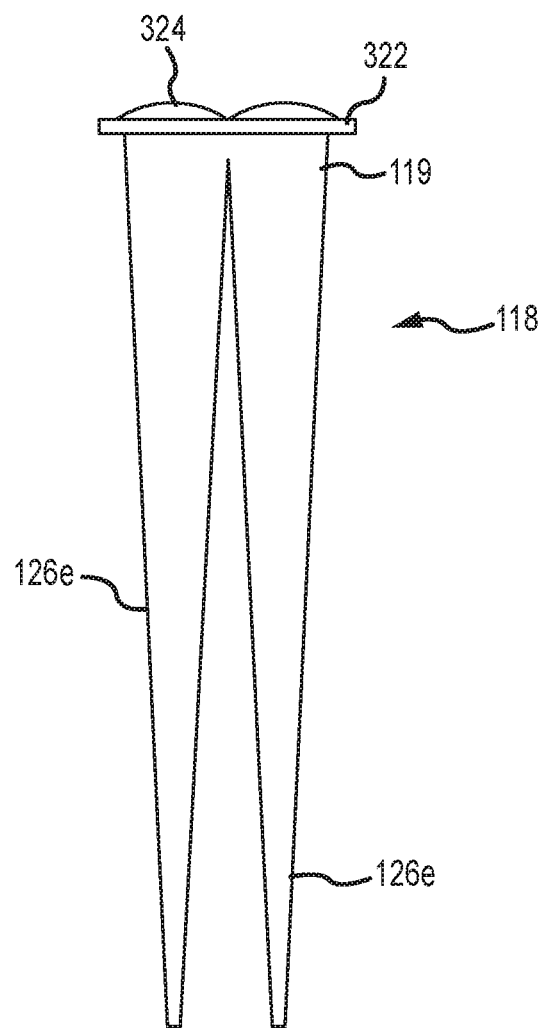

Reference is now made to FIGS. 30 and 31 showing an example implementation for a second optical concentrator 118 including a parallel-processing array 119 of FIG. 1, in which the optical concentrating elements 126 are in the form of tapered waveguides 126e. For illustration purposes, the parallel-processing array 119 shown in FIGS. 30 and 31 includes only four of the tapered waveguides 126e, however arrays of different numbers of such tapered waveguides 126e could be constructed, for example with a larger number of tapered waveguides. As shown in FIG. 30, the second optical concentrator 118 includes an optically-transmissive inlet piece 322 to which the array 119 of tapered waveguides 126e is connected, such as through attachment using an optically-transmissive adhesive. Alternatively, the inlet piece 322 and the array 119 may be made of a single manufactured piece of material, such as for example a single molded or machined piece. The inlet piece 322 includes an array of four lenslets 324 that act as aberration-correcting optical components (e. g., field lenses) to assist effective collection of light into the tapered waveguides 126e.

Figure 32:
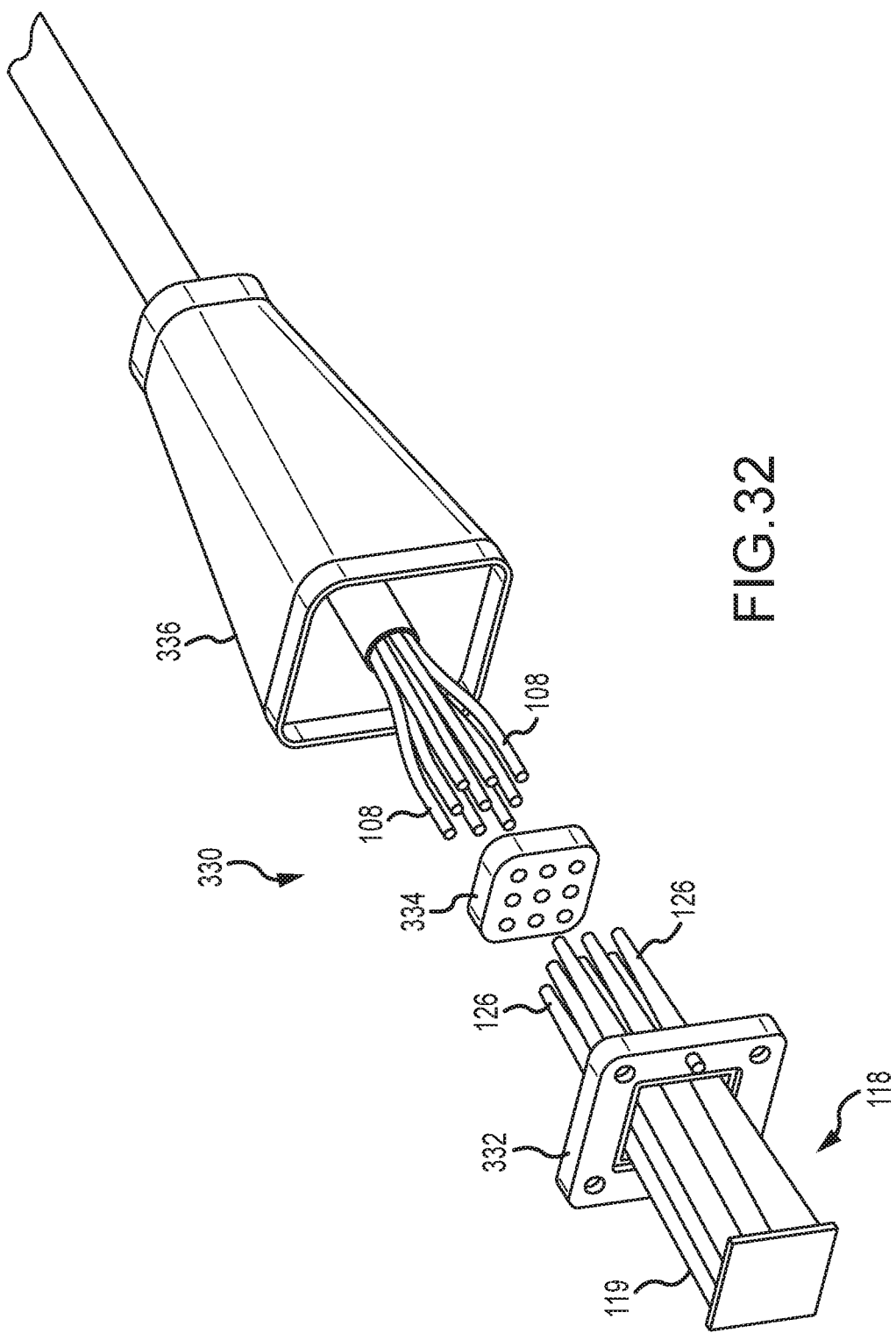
FIG. 32 illustrates an example retaining and connection structure to retain proximal ends of a plurality of light conduits in a fixed relation to receive different spatial portions of processed solar radiation from tapered waveguide optical concentrating elements of a parallel-processing optical concentrator.

Reference is now made to FIG. 32, which shows an example retaining and connection structure 330 for retaining proximal ends of light conduits 108 and coupling such light conduits 108 with a parallel-processing array 119 of tapered waveguides. As shown in FIG. 32, the retaining and connection structure 330 shows an example of a second optical concentrator 118 including a parallel-processing array of concentrating optical elements 126 in the form of the tapered waveguides. The second optical concentrator 118 may have a structure, for example, similar to that shown and described in relation to FIGS. 30 and 31, and may preferably include aberration-correcting optical components disposed proximal of inlet ends of the tapered waveguides similar to as shown in FIGS. 30 and 31. The second optical concentrator 118 is retained in position by a retaining frame 332. Distal ends of the tapered waveguides are aligned with and abutted to proximal ends of corresponding ones of the light conduits 108 in a coupling piece 334 to couple light from each waveguides to the corresponding light conduit 108. The corresponding ends of the light conduits 108 and the tapered waveguides may be adhered to each other, for example using an optically-conductive adhesive. The assembled components shown in FIG. 32 are contained within an enclosure 336, with a proximal end of the enclosure 336 that is optically open to permit optical communication of the second optical concentrator 118 with other optical complementary of a solar light system, such as to receive spectrally-conditioned solar-sourced radiation 122 as shown in FIG. 1 for parallel processing to prepare a plurality of light beams 128 (as shown in FIG. 1).

Figure 13:
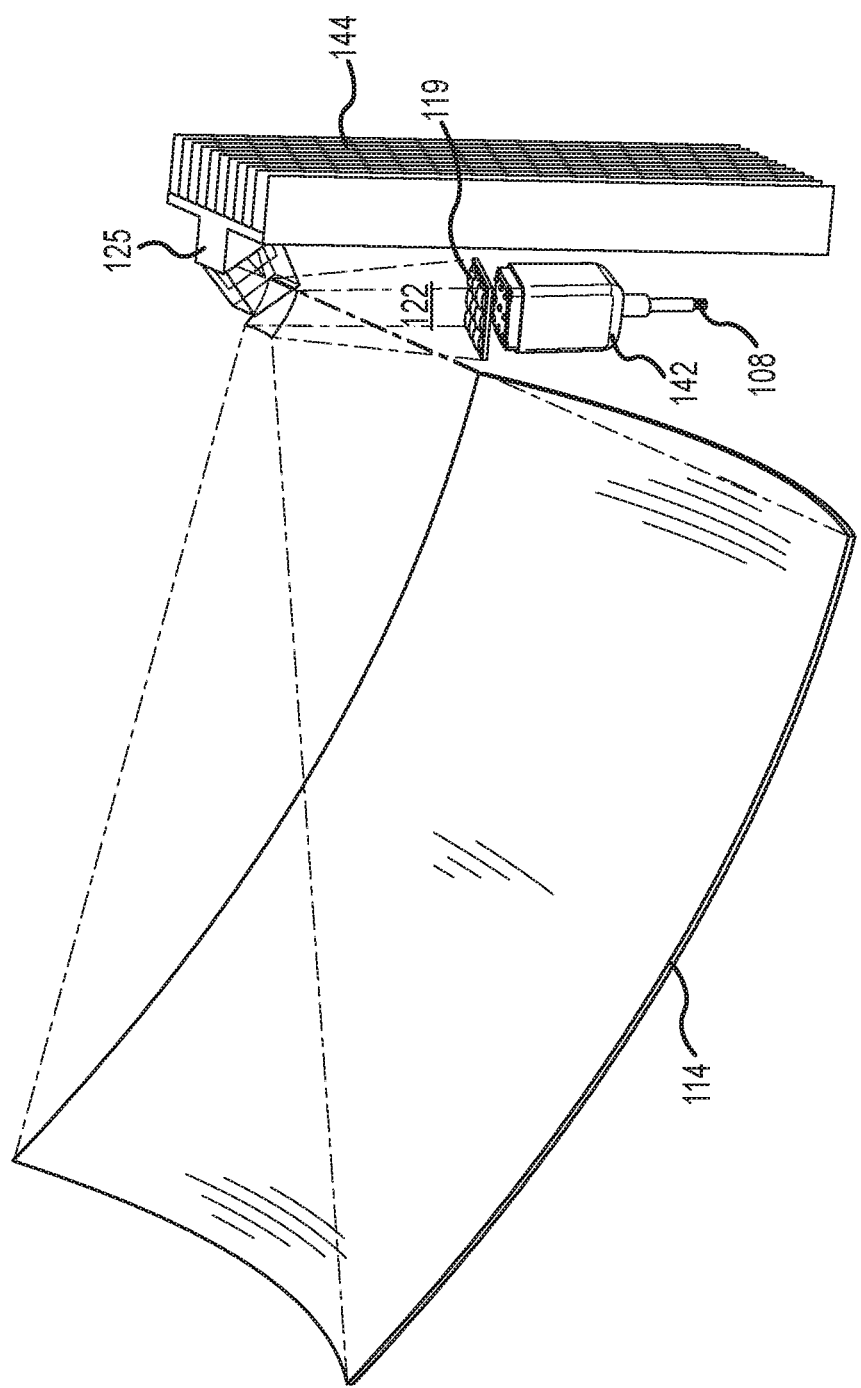
FIG. 13 illustrates an example optical componentry and optical processing for an example solar radiation collection and processing system for solar light applications.

Reference is now made to FIG. 13 together with FIGS. 1 and 10. FIG. 13 illustrates one example combination of optical componentry for use in the solar radiation collection and processing system 100 of FIG. 1. FIG. 13 shows an example optical concentrator 114 in the form of an aspherical concentrating mirror that receives the incident solar radiation 104 and directs the concentrated solar radiation 120 to an example optical filter 116 in the form of a dichroic mirror, with the reflected spectrally-conditioned solar-sourced radiation 122 directed toward the parallel-processing array 119 of second optical concentrator 118 to prepare the light beams 128 directed to proximal ends of the light conduits 108 retained in the retaining structure 142. Shown in FIG. 13 is an example for the photovoltaic electrical power generator 125 for converting the infrared radiation 124 into electrical power. The example of FIG. 13 includes a heat sink 144 to assist removal of heat generated by the optical filter 116 and the photovoltaic electrical power generator 125. In the example configuration shown in FIG. 13, the heat sink 144 includes cooling fins to help dissipate heat, which may be recovered for direct use of recovered thermal energy of for conversion to another form of useful energy.

Figure 14:
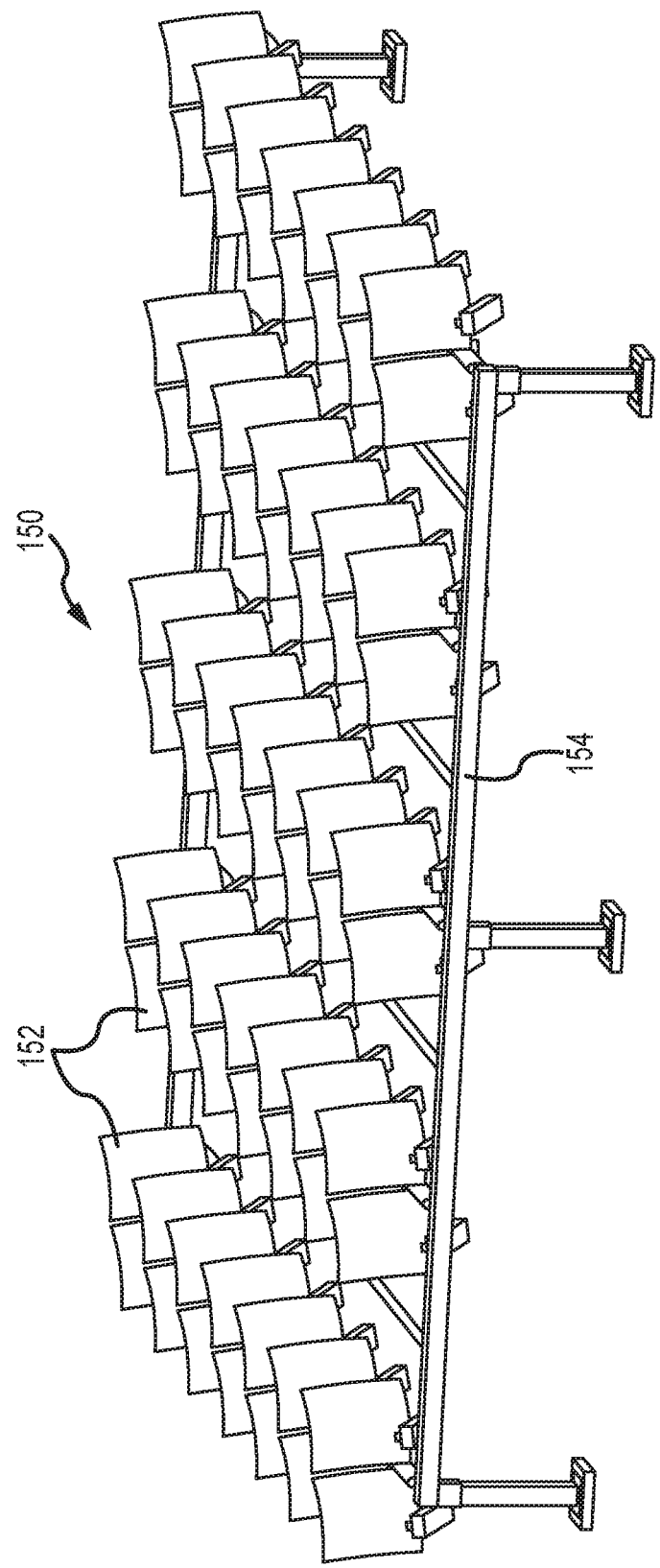
FIG. 14 illustrates an example modularized array of collection of processing units supported on a common support structure for a solar light system.

Reference is now made to FIG. 14, which shows a modularized array 150 of collection of processing units 152 supported on a support structure 154, on which the example solar radiation collection and processing units 152 are adjustably mounted to permit two-axis (dual-axis) solar tracking by the collection and processing units 152. As one example, the solar collection and processing units 152 may include optical componentry as shown in FIG. 13. Each of the units 152 may be optically connected with a different plurality of light conduits (for example through a retaining structure 130, 136, 142 as shown in any of FIG. 8, 9 or 10) to provide a source for visible light to be transmitted through a separate bundle of the light conduits dedicated to each solar radiation collection and processing unit 152.

Figure 15:
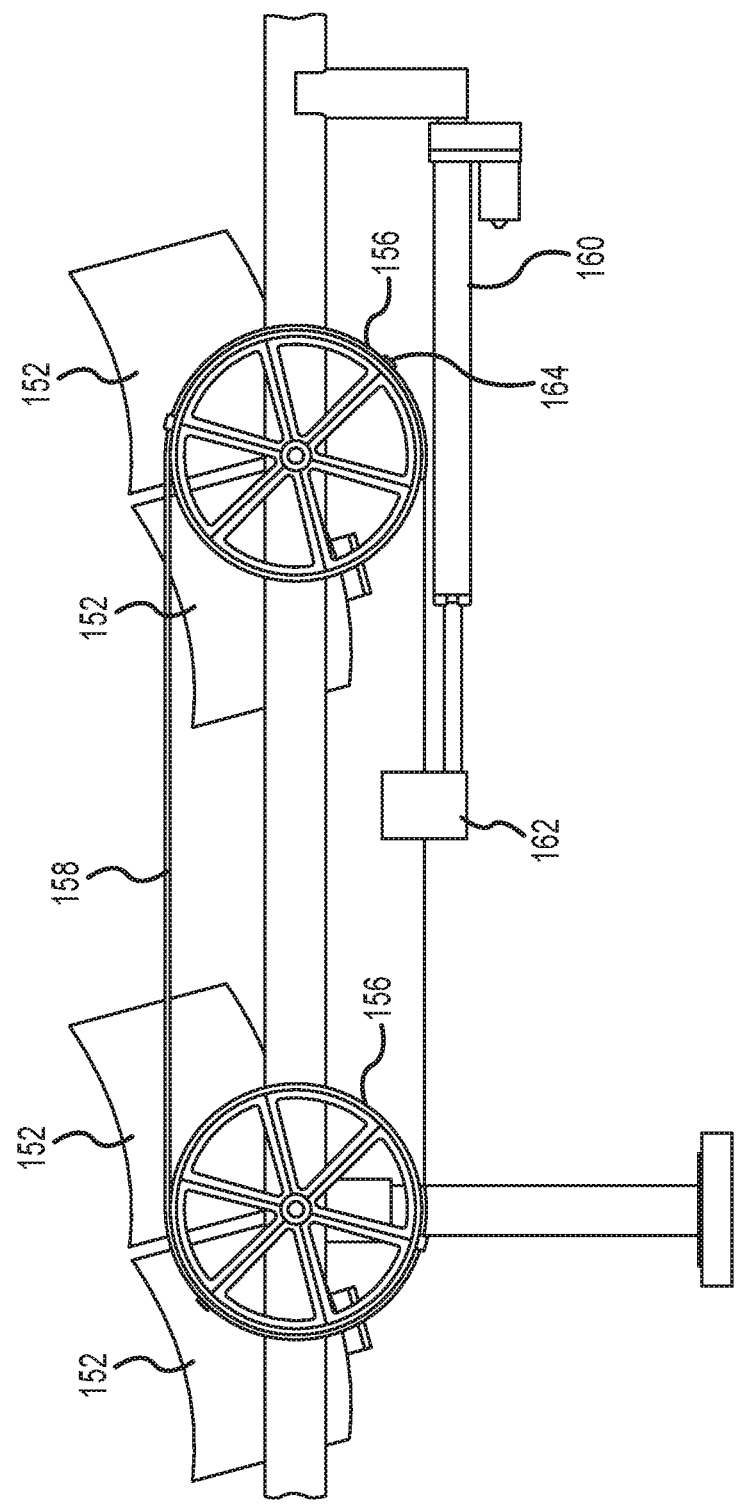
FIGS. 15-17 illustrate example movable mounting of collection and processing units for dual-axis solar tracking for a solar light system.

In the example shown in FIG. 14, the array 150 includes 10 rows of the solar radiation collection and processing units 152 mounted on five rotatable members that extend between frame members of the support structure 154, such that two rows of the units 152 are mounted on each of the rotatable members. For example, the rotatable members may be rotated during the day to track the azimuth of the sun as the sun moves across the sky from east to west during the day. FIG. 15 shows one example mechanism for rotating the rotatable members for azimuth tracking. FIG. 15 is an end view showing four rows of the solar radiation collection and processing units 152 with a pair of rows of units 152 supported on each of two example rotatable members that are rotated through actuation of wheels 156 connected with the rotatable members on which units 152 are mounted. A cable 158 is disposed around the wheels 156 to permit the wheels 156 to be moved in unison through movement of the cable 158. The cable 158 is connected with a linear driver 160 through a cable clamp 162. The cable 158 may be fixedly attached to a wheel 156 through a cable anchor 164, and which may permit adjustment of the cable 158 for relative positioning with the wheel 156. The linear driver 160 may be actuated to move the cable 158 to rotatably reposition the units 152 through rotation of the wheels 156 to rotate the rotatable members on which the units 152 are mounted. The linear driver 160 may be controlled by a dual-axis tracking system that may track positioning of the sun and provide instructions for actuating the linear driver 160 to rotatably reposition the solar radiation collection and processing units 152 as the sun moves across the sky. At the end of a day, the linear actuator 160 may reposition the solar radiation collection and processing units 152 in a position to receive morning sun at the beginning of the next day.

Figure 16:
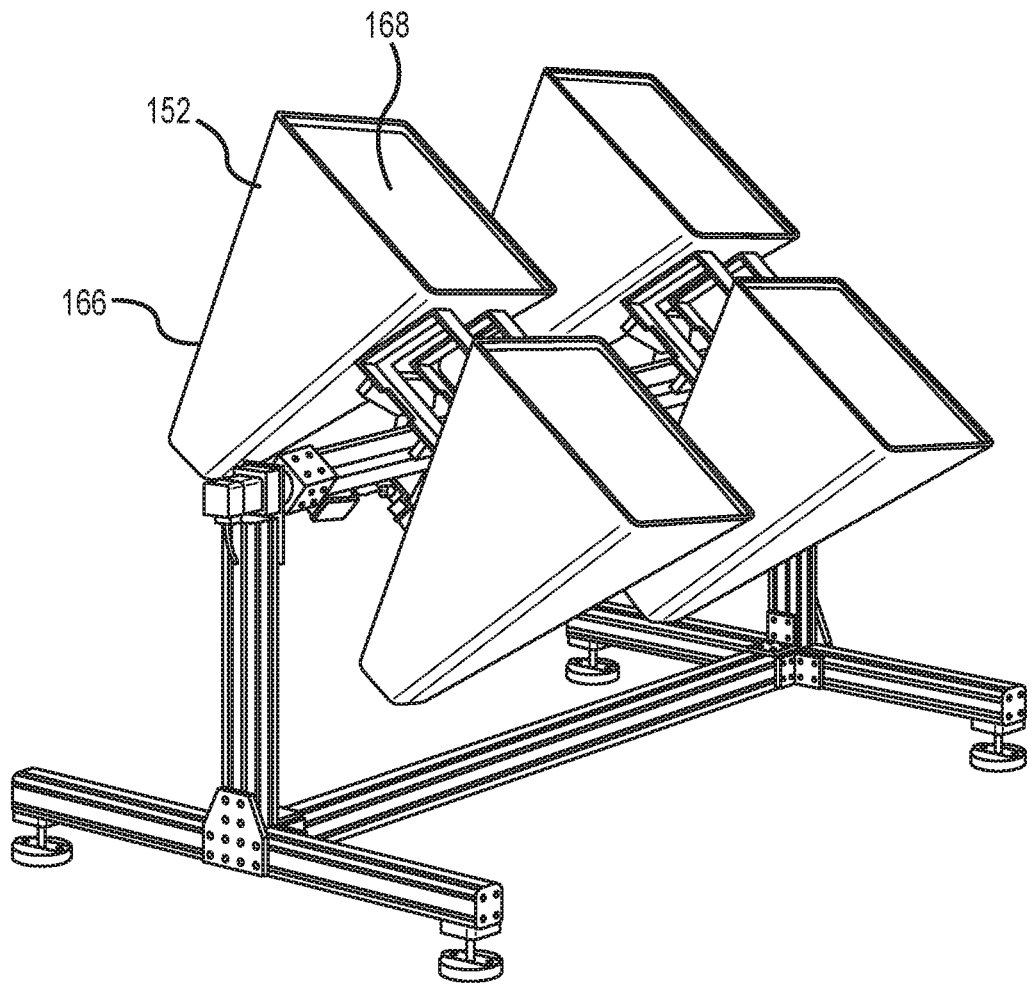
Figure 17:
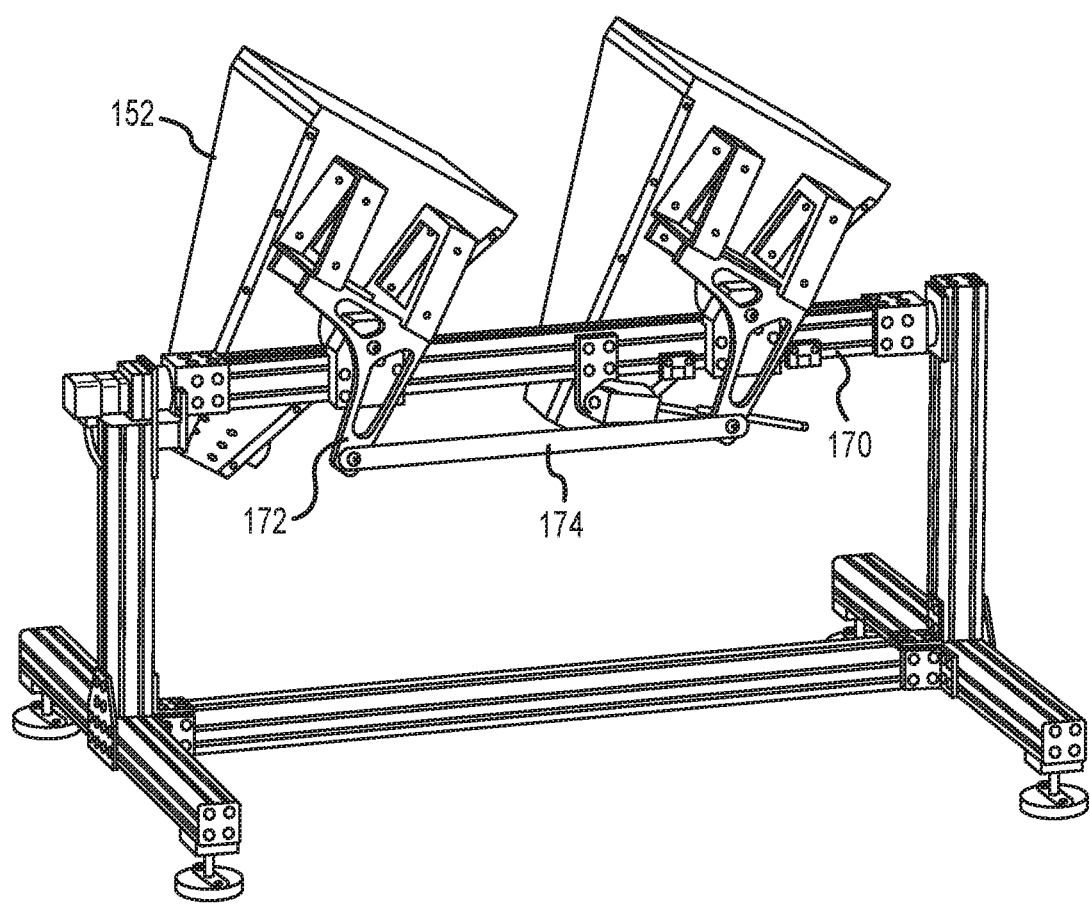

With continued reference to FIG. 14, the solar radiation collection and processing units 152 may be mounted on the rotating members so that positioning of the units 152 may also be adjusted for solar altitude tracking during the day. Referring also to FIGS. 16 and 17, an example of such mounting is shown for some example ones of the solar collection and processing units 152, which are shown in FIGS. 16 and 17 as each including a housing 166 in which optical componentry is disposed and protected. Incident solar radiation may enter the housing 166 through an optically transparent cover 168, (e.g., optically transparent plastic or glass sheet). As shown in FIGS. 16 and 17, the example solar collection and processing modules 152 are pivotally connected with a rotating member 170 through brackets 172 that are in turn pivotally connected with a connecting member 174. The connecting member 174 may be connected with an actuation system controlled by a solar tracker to reposition the connecting member 174 to pivotally adjust positioning of the units 152 for solar altitude tracking. As an alternative to pivoting componentry of the units 152 in a housing 166 as shown in FIG. 16, the componentry of the units 152 may be not enclosed in a protective enclosure, similar to as shown in FIG. 13. In an alternative implementation, the cover 168 of such a collection and processing unit 152 could be in the form of or could include a Fesnel lens for use as a first stage optical concentrator, rather than using a concentrating mirror.

Figure 18:
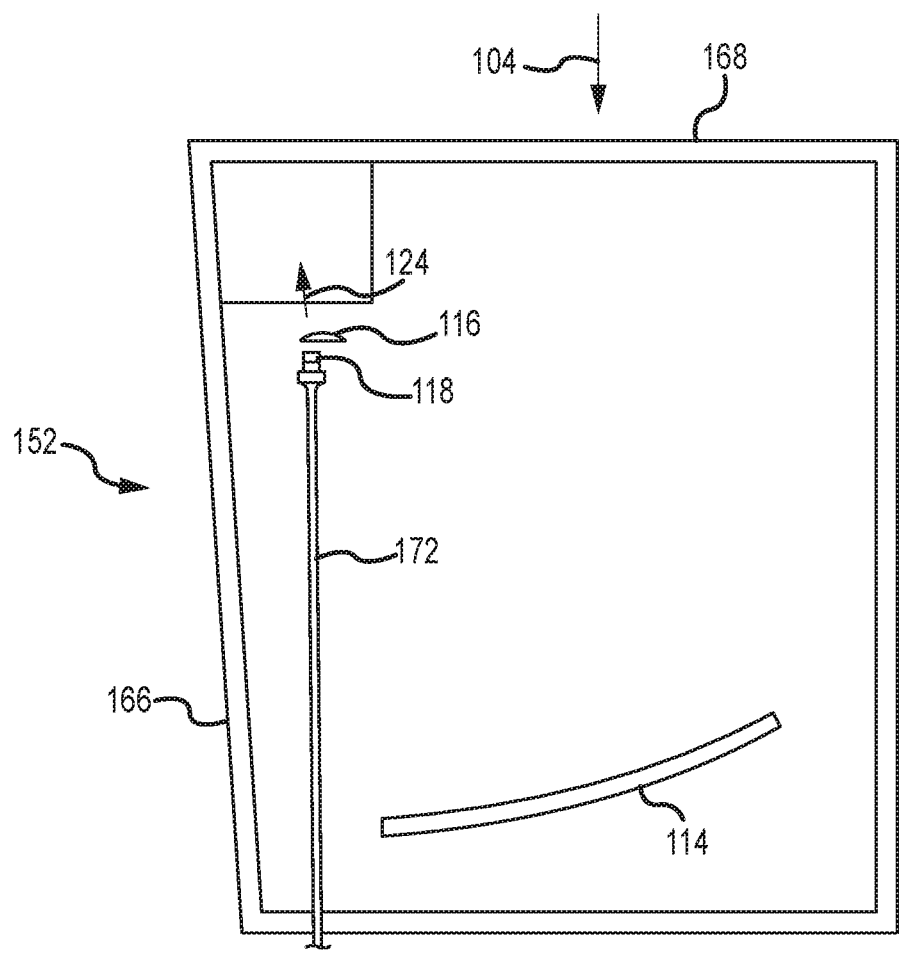
FIG. 18 illustrates an example solar radiation collection and processing unit for a solar light system.

Reference is now made to FIG. 18 together with FIGS. 1 and 14-17, FIG. 18, illustrates an example implementation for a solar radiation collection and processing unit 152 such as may be used in the array 150 of FIG. 14 with the optical componentry of each unit is disposed in a protective enclosure. As illustrated in FIG. 18, the example unit 152 includes the housing 166 that encloses and protects optical processing componentry. The transparent cover 168 on the housing 166 provides an optical path for incident solar radiation 104 to enter the unit 152. Disposed in the housing 166 is the first concentrator 114 illustrated in the form of a concentrating mirror that directs concentrated solar radiation to the optical filter 116, illustrated in the form of a dichroic mirror. The dichroic mirror of the optical filter 116 passes at least a portion of infrared radiation 124 and reflects radiation including visible light to the second optical concentrator 118 to prepare processed solar radiation 106 for delivery to different light conduits 108 that exit from the housing 166 in a bundle 172 of the light conduits 108. The infrared radiation 124 may be directed to a photovoltaic electrical power generator or may be redirected out of the housing 166 or through heat sink elements to dissipate heat generated by the infrared radiation 124. The optical componentry within the housing 166 may, for example, be or be similar to the componentry as shown and described in relation to FIG. 13.

Figure 19:
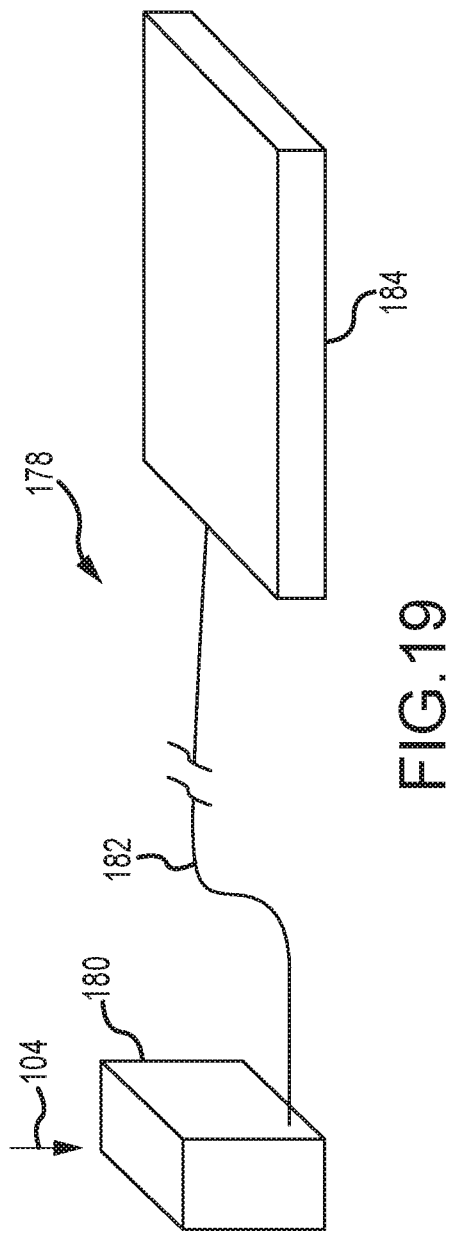
FIGS. 19-21 illustrate an example module combination set for an example modularized solar light system for solar interior lighting.
Figure 20:
Figure 21:
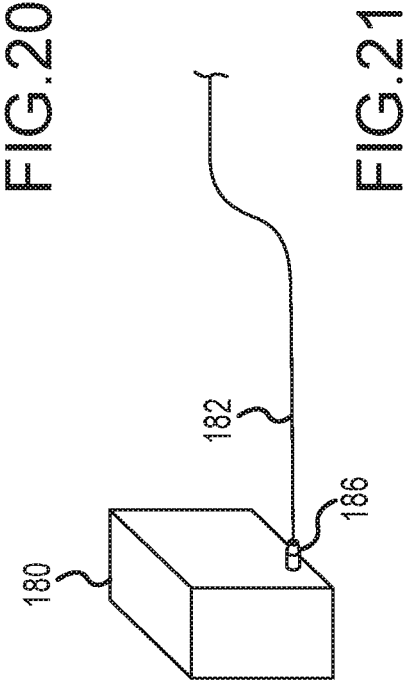

In some preferred implementations, a solar light system may include modularized portions that facilitate easy design and installation to accommodate a variety of interior lighting needs. Reference is now made to FIGS. 19-21 together with FIG. 1. FIGS. 19-21 illustrate some examples of modularized portions for an example solar light system for interior lighting. As shown in FIGS. 19-20 a module set 178 for a solar interior lighting system includes a single solar radiation and collection module 180 a single light transmission module 182 and a single luminaire module 184. As shown in FIG. 19, the solar radiation collection and processing module 180 receives and optically processes incident solar radiation 104 to prepare a solar-sourced output including visible light for interior lighting, all of which is delivered to a single light transmission module 182 that includes a plurality of light conduits, shown in a single bundle of such light conduits, to receive and transmit the delivered processed solar radiation to a single luminaire module 184, from which radiation including visible light may be emitted into an interior space for interior lighting. The light transmission module 182 may include a first end connection structure 186, designed to engage with a corresponding light delivery connection structure of the collection and processing module 180 to facilitate easy optical coupling of the processing module 180 with the light transmission module 182. Likewise, the light transmission module 182 may include a second end structure 188 designed to engage with a corresponding light receiving connection structure of the luminaire module 184 to facilitate easy optical coupling of the light transmission module 182 with the luminaire module 184. In some preferred implementations such as shown in FIG. 19, all of the visible light delivered from the collection and processing unit 180 is transmitted through a single light transmission module 182 to a single luminaire module 184. Standardization of such a module set 178 permits flexibility to include any number of such module sets 178 in a solar interior lighting system to accommodate solar interior lighting applications of varying sizes. Having a 1:1:1 correspondence between a collection and processing module 180, light transmission module 182 and luminaire module 184 simplifies total system design and installation. Such a modularized structure eliminates the need to either split the flow of light to multiple luminaire modules or to direct different ones of the plurality of light conduits to different luminaires, thereby simplifying both overall system design and system installation. The end connection structures 186 and 188 of the light transmission module 182 and the corresponding light delivery connection structure and light receiving connection structure may be designed, for example as plug and receptacle structures, including any appropriate retaining mechanism such as set screws, clamps or other retaining mechanisms. The corresponding connection structures may be enclosed within housings of the collection and processing modules 180 and luminaire module 184, respectively, or the end connection structures 186 and 188 may simply be plugged into corresponding connection structures in the form of receptacles open at the exterior of such a housing and then secured in place. Such a plug/receptacle structure is shown in FIG. 21 for connecting the first end connection structure 186 with a corresponding light delivery connection structure receptacle in the collection and processing module 180.

Figure 22:
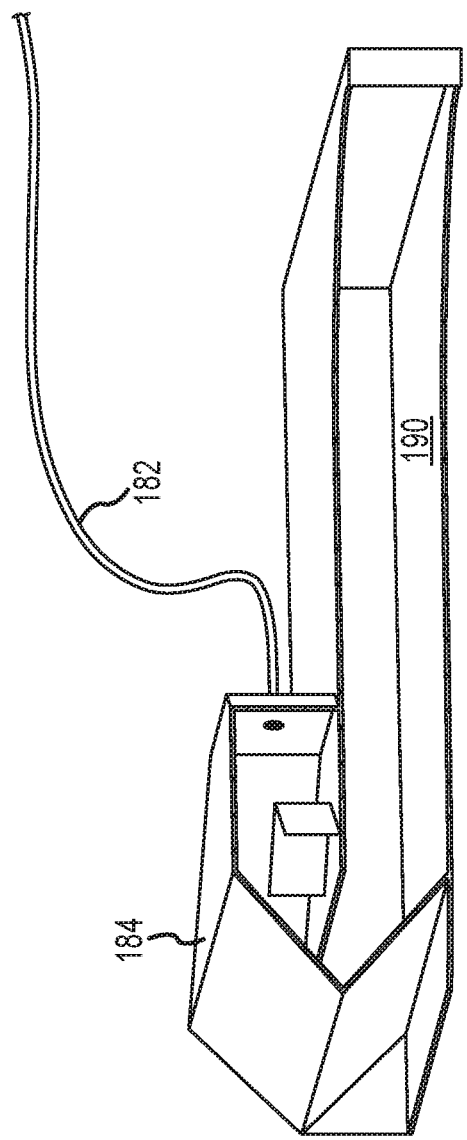
FIG. 22 illustrates an example luminaire for solar interior lighting.

With continued reference to FIGS. 19-21 together with FIG. 1, the collection and processing module 180 may include all of the optical componentry for the solar radiation collection and processing system 102 shown in FIG. 1, including the first optical concentrator 114, optical filter 116 and second optical concentrator 118. In alternative embodiments, however, the second optical concentrator 118, or a portion of the second optical concentrator 118 (e.g., one or more parallel-processing arrays), may be disposed in the light transmission module 182, for example at a terminal end of the first end connection structure 186. The luminaire module 184 may be any structure for receiving processed solar radiation including visible light from the light transmission module 182 and for emitting such visible light into an interior space for lighting. FIG. 22 shows one example implementation for such a luminaire module 184 connected with a single light transmission module 182. The luminaire module 184 includes a transparent sheet 190 through which visible light may exit the luminaire module 184 for delivery to an interior space for lighting.

Figure 23:
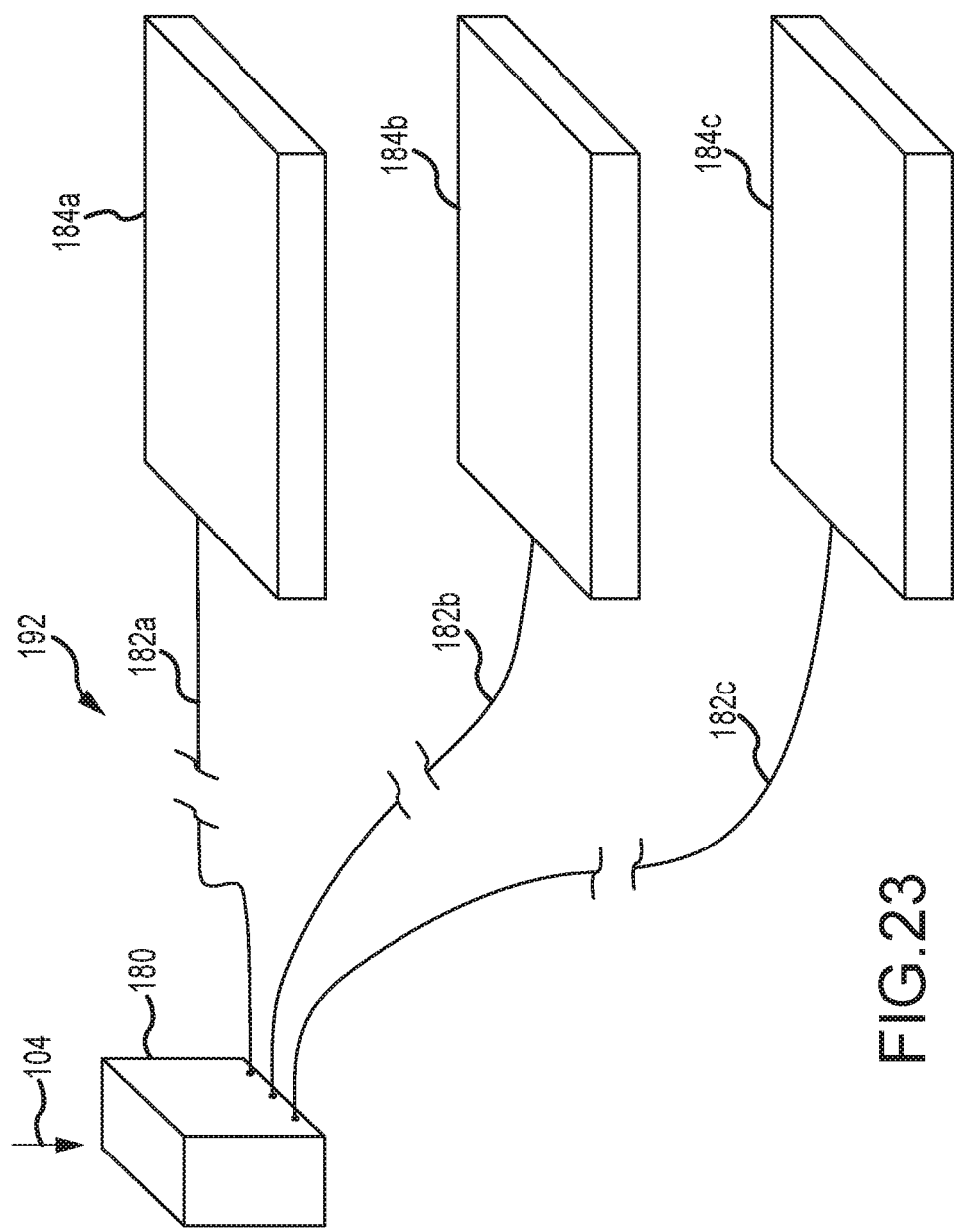

In some other preferred implementations, a modularized solar light system may be modularized to permit convenient connection of a solar radiation collection and processing unit to multiple luminaire modules. FIG. 23 shows an alternative implementation for a modularized solar interior lighting system. FIG. 23 shows an alternative module set 192 including the collection and processing module 180 optically connected to provide light to multiple luminaire modules 184a,b,c (three shown for illustration purposes) through separate corresponding light transmission modules 182a,b,c. In the implementation shown in FIG. 23, the collection and processing module 180 includes multiple separate connection structures to accommodate connection with each of the multiple light transmission modules 182a,b,c. The light transmission modules 182a,b,c and luminaire modules 184a,b,c may be as described previously with respect to FIGS. 19-22. The different pluralities in the different light transmission modules, 182a,b,c may be fed for example, by beams of processed solar radiation output from a single parallel-processing optical concentrator or a corresponding plurality of different parallel-processing optical concentrators arranged in parallel with each other. FIG. 24 shows yet another alternative implementation for a modularized system for solar interior lighting. FIG. 24 shows an alternative module set 194 including the collection and processing module 180 optically connected to provide light to multiple luminaire modules 184a,b,c (three shown for illustration purposes) through a single light transmission module 196 with a single first end connection structure to connect with the collection and processing module 180 and branching to three branches 198a,b,c each having a second end connection structure to connect with a different one of the luminaire modules 184a,b,c. Each of the branches 198a,b,c may include a different group of light conduits connected with the collection and processing module 180. All light conduits of the light transmission module may, for example, be fed by beams processed solar radiation output from a single parallel-processing optical concentrator.

Parallel-processing optical concentrators have been described thus primarily with reference to a single parallel-processing array with a plurality of optical concentrating elements. In some implementations a parallel-processing optical concentrator may include a plurality of different parallel-processing arrays arranged in series, with each array including a different plurality of optical concentrating elements in a parallel-processing arrangement. Some example alternative configurations for a parallel-processing optical concentrator with multiple parallel-processing arrays arranged in series are shown in FIGS. 25-28.

Figure 25:
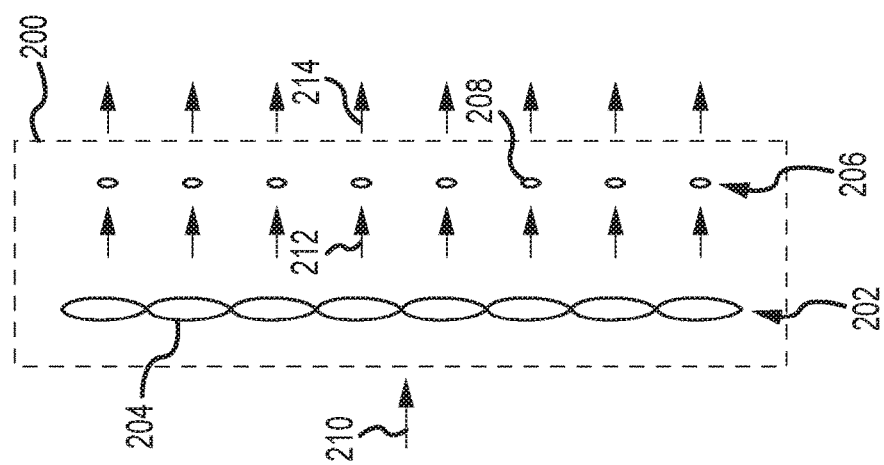

FIG. 25 shows a parallel-processing optical concentrator 200 including two parallel-processing arrays. A first parallel-processing array 202 has a first plurality of optical concentrating elements 204 and a second parallel-processing array 206 has a second plurality of optical concentrating elements 208. During operation, different spatial portions of input solar-sourced radiation 210 are processed through the optical concentration elements 204 of the first parallel-processing array 202 to prepare first concentrated light beams 212. The first concentrated light beams 212 are each directed toward and the processed through a different one of the concentrating elements 208 of the second parallel-processing array 206 to prepare second concentrated light beams 214, which may be directed toward corresponding light conduits (not shown). In some implementations for the example of FIG. 25, most of the light concentration that occurs across the parallel-processing optical concentrator 200 may be accomplished by optical processing through the optical concentrating elements 204 of the first parallel-processing array 202 and the optical concentrating elements 208 of the second parallel-processing array 206 may provide some additional concentration but also may operate primarily as aberration-correcting optical elements to help deliver all concentrated radiation into corresponding light conduits. For example, the first parallel-processing array 202 could be of a type similar to the parallel-processing array 119 of any of FIG. 4-7, 10 or 11 and the second parallel-processing array 206 could be an array of a corresponding number of the aberration-correcting lenses 134 of FIGS. 8 and 9.

Figure 28:
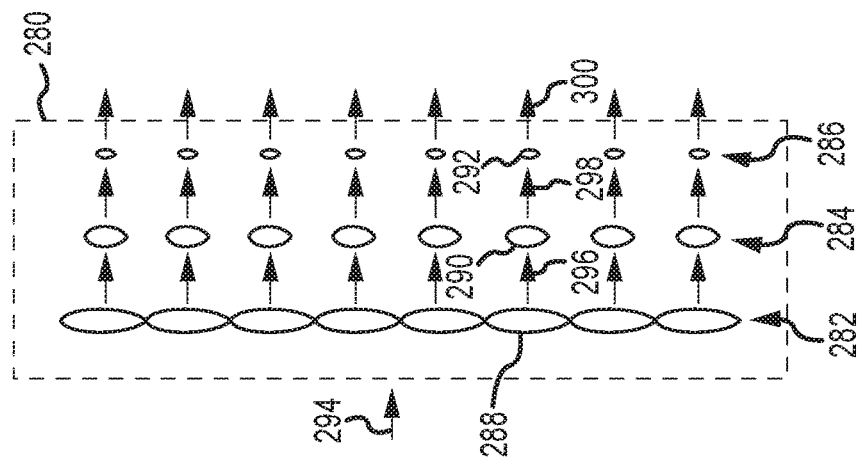
FIGS. 25-28 illustrate example alternative configurations for a parallel-processing optical concentrator with multiple parallel-processing arrays arranged in series.
Figure 26:
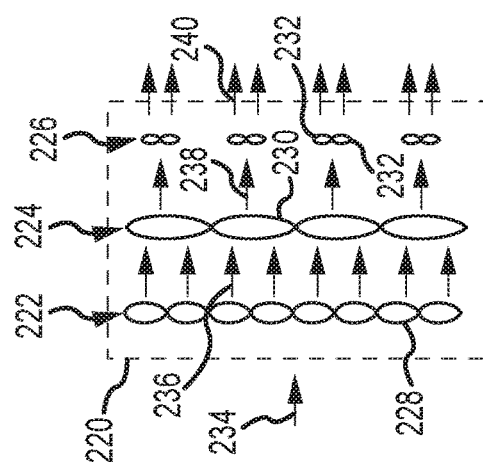
Figure 27:
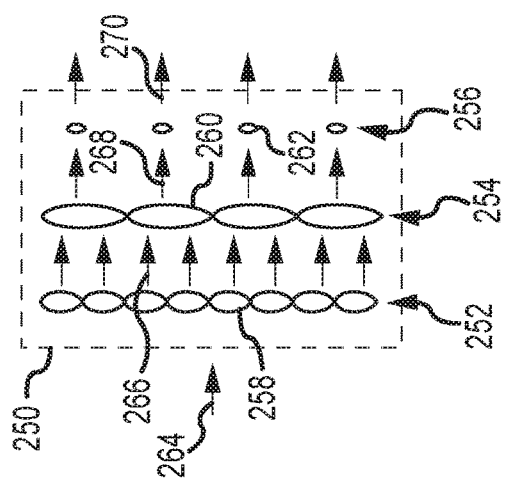

A parallel-processing optical concentrator may include more than two parallel-processing arrays of optical concentrating elements in series. Some example implementations with three parallel-processing arrays are shown in FIGS. 26-28. As shown in example implementations in FIGS. 26 and 27, the different parallel-processing arrays in series need not include the same number of optical concentrating elements or have uniform spacing between all optical concentrating elements within a parallel-processing array.

FIG. 26 shows an example parallel-processing optical concentrator 220 including three parallel-processing arrays 222, 224 and 226 in series and including concentrating optical elements 228, 230 and 232, respectively. During operation, input solar-sourced radiation 234 is optically processed by the optical concentrating elements 228 of first parallel-processing array 222 to prepare first concentrated light beams 236, which are optically processed by the optical concentrating elements 230 of the second parallel-processing array 224 to prepare second concentrated light beams 238, which are in turn optically processed by the optical concentrating elements 232 of the third parallel-processing array 226 to prepare third concentrated light beams 240, which may for example be directed to different light conduits. As seen in FIG. 26, the example parallel-processing optical concentrator 220 includes the same number of optical concentrating elements in the first parallel-processing array 222 and the third parallel-processing array, whereas the second parallel-processing array 224 includes only half as many optical concentrating elements as the other two arrays.

FIG. 27 shows an example parallel-processing optical concentrator 250 including three parallel-processing arrays 252, 254 and 256 in series and including optical concentrating elements 258, 260 and 262, respectively. During operation, input solar-sourced radiation 264 is optically processed by the optical concentrating elements 258 of the first parallel-processing array 252 to prepare first concentrated light beams 266, which are optically processed by the optical concentrating elements 260 of the second parallel-processing array 254 to prepare second concentrated light beams 268, which are in turn optically processed by the optical concentrating elements 262 of the third parallel-processing array 256 to prepare third concentrated light beams 270, which may for example be directed different light conduits. As seen in FIG. 27, the example parallel-processing optical concentrator 250 includes a larger number of optical concentrating elements in the first parallel-processing array and a smaller number of optical concentrating elements (half as many) in each of the second parallel-processing array 254 and the third parallel-processing array 256.

FIG. 28 shows an example parallel-processing optical concentrator 280 including three parallel-processing arrays 282, 284 and 286 in series and including optical elements 288, 290 and 292, respectively. During operation, input solar-sourced radiation 294 is optically processed by the optical concentrating elements 288 of the first parallel-processing array 282 to prepare first concentrated light beams 296, which are optically processed by the optical concentrating elements 290 of the second parallel-processing array 284 to prepare second concentrated light beams 298, which are in turn optically processed by the optical concentrating elements 292 of the third parallel-processing array 286 to prepare third concentrated light beams 300, which may for example be directed to different light conduits.

In each of the example parallel-processing optical concentrators of FIGS. 25-28, the last parallel-processing array in series may include optical elements with a primary function of correcting for light aberration to deliver light beams for effective receipt by corresponding light conduits.

It will be appreciated that in the examples shown in each of FIGS. 25-28, each of the different parallel-processing arrays, or any combination of adjacent parallel-processing arrays, could alternatively be considered a separate parallel-processing optical concentrator. In preferred implementations, a parallel-processing optical concentrator will effect a factor of concentration of intensity of radiation, and preferably of visible light, by a factor as described in the Summary section above for a parallel-processing optical concentrator (e.g., concentration factor between final output of the concentrated light beams 214, 240, 270 or 300 relative to corresponding input solar-sourced radiation 210, 234, 264 or 294, respectively). Also, in some preferred implementations, at least one parallel-processing arrays, and possibly each of two or more parallel-processing arrays, provides such a concentration factor. As will be appreciated, the concentration factor for a concentrating lens will depend upon the positioning and relative aperture sizes of downstream optical elements that receive the radiation of a concentrated light beam.

EXAMPLE IMPLEMENTATION COMBINATIONS

Some example implementation combinations, and for various types of implementation applications, which may be the subject of claims with or without additional features as disclosed above or in the claims below, are summarized as follows:

1. A solar light system, comprising a solar radiation collection and processing system to receive incident solar radiation during daylight hours and to process the incident solar radiation to prepare and provide processed solar radiation including concentrated visible light, the collection and processing system including:
   an optical filter to remove at least a portion of radiation outside of the visible light range to prepare spectrally-conditioned solar radiation including visible light;
   a parallel-processing optical concentrator disposed to receive as input at least a portion of the spectrally-conditioned solar radiation and to prepare multiple beams of processed solar radiation including concentrated visible light, the parallel-processing optical concentrator comprising at least one parallel-processing array with a plurality of optical concentrating elements in a parallel-processing arrangement to receive and concentrate different spatial portions of solar-sourced radiation input to the parallel-processing array.

2. A system according to example combination 1, wherein:
   the collection and processing system includes a first stage optical concentrator disposed to receive and concentrate solar radiation to form first concentrated solar radiation; and
   the optical filter is disposed to receive and process at least a portion of the first concentrated solar radiation to the spectrally-conditioned solar radiation including visible light.

3. A system according to example combination 2, wherein said first stage optical concentrator comprises a concentrating mirror.

4. A system according to either one of example combination 2 or example combination 3, wherein said first stage optical concentrator increases an intensity of visible light by a factor of 20 to 2500.

5. A system according to any one of example combinations 2-4, wherein the optical filter removes at least a majority of infrared radiation of solar radiation input to the optical filter.

6. A system according to any one of example combinations 2-5, wherein the spectrally-conditioned solar radiation has a visible light intensity of 20 to 2500 times that in the incident solar radiation.

7. A modularized solar light system for interior lighting, comprising:
   a solar radiation collection and processing module disposed to receive and optically process incident solar radiation during daylight hours to prepare a solar-sourced radiation output including concentrated visible light, the collection and processing module including optical components to prepare the solar-sourced radiation output, the optical components including an optical filter to remove at least a portion of solar radiation outside of the visible light range to prepare spectrally-conditioned solar radiation;
   a light transmission module in optical communication with the communication with the collection and processing module and including a plurality of light conduits to receive and transmit at least a portion of the processed solar radiation;

a luminaire module in optical communication with one or more of the light conduits of the light transmission module to receive and emit solar radiation including visible light into an interior space for interior lighting;

the collection and processing module comprising a light delivery connection structure, the luminaire module comprising a light receiving connection structure and the light transmission module comprising first end and second end connection structures, with the first end connection structure being engageable with the light delivery connection structure to optically couple the collection and processing module with the light transmission module to provide at least a portion of the solar-sourced radiation output from the collection and processing module to the light transmission module and the second end connection structure being engageable with the light receiving connection structure to optically couple the light transmission module with the luminaire module to provide some or all solar-sourced radiation output from the light transmission module to the luminaire module; and a solar radiation collection and processing system comprising the optical filter and a parallel-processing optical concentrator on an optical path downstream of the optical filter to prepare a plurality of separate light beams of processed solar radiation including concentrated visible light, each said light beam being directed to a different one of the light conduits for transmission through the light conduits, wherein optical componentry of the parallel-processing optical concentrator is in a portion of the modularized solar light system selected from the group consisting of the solar radiation collection and processing module, the light transmission module and a combination of the solar radiation collection and processing module and the light transmission module.

8. A system according to example combination 7, wherein said light transmission module comprises a plurality of light conduits to receive all of the solar-sourced radiation output from a single collection and processing module.

9. A system according to example combination 7, wherein the collection and processing system includes a plurality of said light delivery connection structures to engage a plurality of said first end connection structures of a corresponding plurality of said multiple said light transmission modules for providing solar-sourced radiation including concentrated visible light to a plurality of said luminaire modules.

10. A system according to example combination 7, wherein the light transmission module includes a plurality of multiple said second end connection structures to engage with a plurality of said light receiving connection structures of one or more said luminaire units.

11. A system according to any one of example combinations 7-10, wherein the first and second end connection structures have different geometries corresponding to different geometries of the light delivery connection structures and the light receiving connection structure, so that the first and second end connection structures are not interchangeably connectable with the light delivery connection structures and the light receiving connection structures.

12. A system according to any one of example combinations 7-11, wherein luminaire module comprises a single luminaire.

13. A system according to any one of example combinations 7-12, comprising a plurality of said collection and processing modules each optically connected with a different said luminaire module through a different said light transmission module.

14. A system according to example combination 13, wherein each said collection and processing module is optically connected to only one said light transmission module.

15. A system according to example combination 13, wherein each said collection and processing module is optically connected through at least one light transmission module with a plurality of said luminaire modules.

16. A system according to example combination 13, wherein each said light transmission module is optically connected to only one said luminaire module.

17. A system according to any one of example combinations 13-16, wherein the plurality of collection and processing modules are supported on a common support structure.

18. A system according to example combination 17, wherein the plurality of collection and processing modules are mechanically interconnected to be movable in unison on said common support structure for two-axis solar tracking.

19. A modularized solar light system, comprising:

a plurality of solar radiation collection and processing units each disposed to receive incident solar radiation and each including a separate solar radiation collection and processing system to optically process incident solar radiation during daylight hours to prepare processed solar radiation including concentrated visible light, each said collection and processing unit including an optical filter to remove at least a portion of radiation outside of the visible light range, to prepare spectrally-conditioned solar radiation, and an optical concentrator;

each said collection and processing unit being optically connected with a different plurality of light conduits to receive at least a portion of the processed solar radiation from the corresponding said collection and processing unit;

the plurality of collection and processing units being two-axis adjustably mounted on a mechanical support structure for two-axis solar tracking, with the plurality of collection and processing units being mechanically interconnected with a single solar tracking mechanical actuation system to actuate adjustment of positioning of the plurality of collection and processing units in unison by the mechanical actuation system for two-axis solar tracking of the plurality of collection and processing units.

20. A system according to example combination 19, wherein said plurality of collection and processing units include at least one row of said collection and processing units mounted on a movable member that is movable through actuation of the mechanical actuation system to move the collection and processing units in unison for one of azimuth and altitude tracking.

21. A system according to example combination 20, wherein the said plurality of collection and processing units in a said row are each movably connected with said rotatable member and are all mechanically interconnected, wherein through the mechanical interconnection the said collection and processing units of the said row are movable through actuation of the mechanical actuation system in unison relative to the movable member for the other one of azimuth and altitude tracking.

22. A system according to either one of example combination 20 or example combination 21, comprising at least two said rows of said collection and processing units mounted on the movable member.

23. A system according to any one of example combinations 20-22, comprising a plurality of said movable members each with at least one said row of collection and processing units mounted thereon; and wherein the plurality of said movable members are mechanically interconnected for simultaneous tracking movement of the movable members by the mechanical actuation system.

24. A system according to any one of example combinations 19-23, wherein each said collection and processing unit comprises an incident solar radiation collection aperture area in a range of from 0.01 to 2 square meters.

25. A system according to any one of example combinations 19-24, wherein each said collection and processing unit comprises a collection and processing module according to any one of example combinations 7-18.

26. A system according to any one of example combinations 19-25, wherein each of said different plurality of light conduits is in a said light transmission module according to any one of example combinations 7-18.

27. A system according to any one of example combinations 19-26, wherein the collection and processing system comprises an incident solar radiation collection aperture area in a range of from 250 square centimeters to 2 square meters.

28. A method for solar light processing, the method comprising:

optically processing incident solar radiation to prepare processed solar radiation including concentrated visible light and transmitting at least a portion of the processed solar radiation to a location for use;

the optically processing comprising:

removing at least a portion of solar radiation outside of the visible light range to prepare spectrally-conditioned solar radiation; and concentrating at least a portion of the spectrally-conditioned solar radiation through a parallel-processing optical concentrator to prepare multiple light beams of processed solar radiation including concentrated visible light, the parallel-processing optical concentrator comprising a parallel-processing array with a plurality of optical concentrating elements in a parallel-processing arrangement to concentrate different spatial portions of solar radiation input to the parallel-processing array.

29. A method according to example combination 28, wherein the transmitting comprises optically coupling each said beam of processed solar radiation to a different one of a plurality of light conduits for transmission to another location for use of the concentrated visible light.

30. A method according to either one of example combination 28 or example combination 29, wherein:

the concentrating is second stage concentrating and the method comprises first stage concentrating at least a portion of collected incident solar radiation to prepare a first concentrated solar radiation;

directing at least a portion of the first concentrated solar radiation to the removing to prepare the spectrally-conditioned solar radiation.

31. A method according to example combination 30, wherein the first stage concentrating comprises increasing an intensity of at least visible light by a factor of 25 to 2500 relative to the incident solar radiation.

32. A method according to any one of example combinations 28-31, wherein the removing comprises removing at least a majority of solar infrared radiation in solar-sourced radiation input to the removing.

33. A method according to either one of example combination 31 or example combination 32, wherein the second stage concentrating comprises increasing an intensity of at least visible light by at least a factor of 5 relative to the spectrally-conditioned solar radiation.

34. A system or method according to any one of example combinations 1-33, wherein the processed solar radiation comprises a plurality of light beams and a plurality of light conduits are disposed to each receive at least a portion of the processed solar radiation of a different said light beam.

35. A system or method according to example combination 34, wherein at least one said light conduit comprises an optically conductive plastic material.

36. A system or method according to example combination 35, wherein the plastic material comprises an acrylic plastic.

37. A system or method according to any one of example combinations 34-36, wherein each said light conduit comprises an optical fiber.

38. A system or method according to example combination 37, wherein at least one said light conduit comprises a plastic optical fiber.

39. A system or method according to any one of example combinations 34-38, wherein each said light conduit comprises a maximum cross dimension of from 0.25 to 12.5 millimeters.

40. A system or method according to any one of example combinations 34-39, wherein each said light conduit has length in a range of from 3 to 150 meters.

41. A system or method according to any one of example combinations 34-40, wherein proximal ends of the plurality of light conduits are retained in fixed relation relative to each other by a retaining structure.

42. A system or method according to example combination 41, wherein the proximal ends of adjacent said light conduits of the plurality of light conduits as retained by the retaining structure are separated by a distance of at least 2 millimeters.

43. A system or method according to any one of example combinations 1-42, wherein a said collection and processing system comprises a parallel-processing optical concentrator disposed to receive as input at least a portion of the spectrally-conditioned solar radiation and to prepare multiple beams of processed solar radiation including concentrated visible light, the parallel-processing optical concentrator comprising at least one parallel-processing array with a plurality of optical concentrating elements in a parallel-processing arrangement to receive and concentrate different spatial portions of solar-sourced radiation input to the parallel-processing array.

44. A system or method according to example combination 43, wherein the parallel-processing optical concentrator comprises a plurality of said parallel-processing arrays in series and each including a different said plurality of optical concentrating elements in a parallel-processing arrangement.

45. A system or method according to example combination 44, wherein a said plurality of optical concentrating elements of at least one said parallel-processing array is different in number than a said plurality of optical concentrating elements of at least one other said parallel-processing array.

46. A system or method according to any one of example combinations 43-45, wherein at least one said parallel-processing array comprises a said plurality of optical concentrating elements corresponding in number with a said plurality of said light conduits.

47. A system or method according to example combination 45, wherein a said parallel-processing array comprising a said plurality of optical concentrating elements corresponding in number with a said plurality of said light conduits is a last in series of a plurality of said parallel-processing arrays arranged in series in the parallel-processing optical concentrator.

48. A system or method according to any one of example combinations 43-45, wherein each said optical concentrating element has an aperture with a maximum cross dimension in the range of from 0.5 to 25 millimeters.

49. A system or method according to any one of example combinations 43-48, wherein for at least one said parallel-processing array, each said optical concentrating element is an optical concentrating lens.

50. A system or method according to any one of example combinations 43-49, wherein for at least one said parallel-processing array the said plurality of optical concentrating elements are in a single fabricated piece of lens material.

51. A system or method according to example combination 50, wherein the lens material is a plastic material.

52. A system or method according to either one of example combination 50 or example combination 51, wherein the lens material comprises an acrylic plastic.

53. A system or method according to any one of example combinations 50-5245-47, wherein the single fabricated piece is a single molded plastic piece.

54. A system or method according to any one of example combinations 43-53, wherein for at least one said parallel-processing array each said optical concentrating element is a light funnel.

55. A system or method according to any one of example combinations 43-54, wherein for at least one said parallel-processing array adjacent ones of the said optical concentrating elements have a common edge boundary.

56. A system or method according to any one of example combinations 43-55, wherein for each said parallel-processing array, the plurality of optical concentrating elements are retained in fixed relation by a retaining structure.

57. A system or method according to any one of example combinations 43-56, wherein for at least one said parallel-processing array apertures of adjacent ones of the plurality of optical concentrating elements are separated by a distance of no more than 2 millimeters.

58. A system or method according to any one of example combinations 43-57, wherein for at least one said parallel-processing array each said optical concentrating element is spaced from a proximal end of a corresponding said light conduit by a distance of from 0.5 to 25 millimeters.

59. A system or method according to any one of example combinations 43-58, wherein for at least one said parallel-processing array each said optical concentrating element has an aberration-correcting optical component disposed in the optical path between each said optical concentrating element and a corresponding said light conduit.

60. A system or method according to example combination 59, wherein the aberration-correcting components are in a said parallel-processing array that is last in series of a plurality of said parallel-processing arrays.

61. A system or method according to any one of example combinations 43-60, wherein a said parallel-processing optical concentrator increases an intensity of at least a visible light portion of solar-sourced radiation processed by the parallel optical concentrator by a factor of at least 3.

62. A system or method according to any of example combinations 43-61, wherein a said parallel-processing optical concentrator corresponds with from 4 to 100 said light conduits.

63. A system or method according to any one of example combinations 43-62, comprising a plurality of said parallel-processing optical concentrators each corresponding with a different said plurality of light conduits.

64. A system or method according to any of example combinations 1-63, wherein the processed solar radiation is spectrally conditioned with at least a portion of solar infrared radiation removed.

65. A system or method according to any one of example combinations 1-64, wherein the processed solar radiation includes visible range light with an intensity of 1000 times to 12,500 times that of the incident solar radiation.

66. A system or method according to any one of example combinations 1-65, wherein the optical filter is operable to remove at least a portion of solar infrared radiation.

67. A system or method according to any one of example combinations 1-66, comprising a photovoltaic electrical power generator, and wherein the optical filter is operable to remove at least a majority of solar infrared radiation and direct removed solar infrared radiation to operate the photovoltaic electrical power generator.

68. A system or method according to any of example combinations 1-67, wherein the optical filter is operable to remove at least a majority of solar spectrum energy at wavelengths larger than 620 nm.

69. A system or method according to any one of example combinations 1-68, wherein the optical filter is operable to remove at least a portion of solar ultraviolet radiation.

70. A system or method according to any one of example combinations 1-69, wherein the optical filter comprises at least one dichroic mirror.

71. A system or method according to example combination 70, wherein the radiation outside of the visible light range being removed passes through the dichroic mirror.

72. A system or method according to either one of example combination 70 or example combination 71, wherein retained radiation including visible light is reflected or transmitted by the dichroic mirror.

73. A system or method according to any one of example combinations 1-72, wherein for at least one said parallel-processing array each said optical concentrating element is a light funnel.

74. A system or method according to example combination 73, wherein each said light funnel comprise a tapered waveguide.

75. A system or method according to either one of example combination 73 or 74, wherein a distal end of each said light funnel abuts a proximal end of a different corresponding one of the plurality of light conduits.

76. A system or method according to any one of example combinations 73-75, wherein the distal end each said light funnel is adhered to the proximal end of the corresponding said light conduit with an optically-conductive adhesive.

77. A system or method according to any one of example combinations 1-76, comprising a parallel-processing array of aberration-correcting optical components with each said aberration-correcting optical component disposed in the optical path of and adjacent to a proximal end of a different said optical-concentrating element.

78. A method according to example combination 77, wherein the aberration-correcting optical components are field lenses.

79. A method according to any one of example combinations 1-78, comprising a second parallel-processing optical concentrator disposed to receive as input at least a portion of the removed solar infrared radiation and to prepare a plurality of beams of concentrated infrared radiation, and wherein:

the photovoltaic electrical power generator comprises a plurality of separate photovoltaically active regions corresponding with the plurality of beams of concentrated infrared radiation, each said photovoltaically active region disposed to receive a different said beam of concentrated infrared radiation for photovoltaic electrical power generation.

The foregoing discussion of the invention and different aspects thereof has been presented for purposes of illustration and description. The foregoing is not intended to limit the invention to only the form or forms specifically disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Although the description of the invention has included description of one or more possible implementations and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described or claimed with respect to any disclosed implementation may be combined in any combination with one or more of any other features of any other implementation or implementations, to the extent that the features are not necessarily technically compatible, and all such combinations are within the scope of the present disclosure.

The terms "comprising", "containing", "including" and "having", and grammatical variations of those terms, are intended to be inclusive and nonlimiting in that the use of such terms indicates the presence of some condition or feature, but not to the exclusion of the presence also of any other condition or feature. A reference to an optical operation, optical processing unit, optical component or optical element (e.g., first stage optical concentrator, optical mirror, parallel-processing optical concentrator, light conductor) or referenced radiation (e.g., referenced incident solar radiation, solar radiation, solar-sourced radiation, concentrated solar radiation, spectrally-conditioned solar radiation, processed solar radiation, light beam) as being positioned, disposed, directed or the like relative to another optical operation, optical processing unit, optical component or optical element or relative to another referenced radiation does not exclude the presence of intermediate optical operations, optical-processing units, optical components, optical elements or radiation between the relatively referenced items. Referenced optical operations, optical processing units, optical components and optical elements (e.g., first stage optical concentration, first stage optical concentrator, optical filtering, optical filter, second stage optical processing, parallel-processing optical concentrator, parallel-processing array, optical concentrating element) may be comprised of one or more optical sub-operations, optical components, optical subcomponents, optical elements and/or optical sub-elements that together provide the optical processing capability of the referenced optical operation or optical processing unit, optical component or optical element. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" consisting of or "consisting of only" (or the appropriate grammatical variation of such narrower terms). For example, a statement that some thing "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term "at least a portion" means all or a portion that is less than all. The term "at least a part" means all or a part that is less than all. "A portion", "a part" or similar text in reference to identified solar-sourced radiation (e.g., a portion or part of spectrally-conditioned solar radiation or of incident solar radiation or of solar-sourced radiation or of solar radiation or of processed solar radiation or of a light beam) refers to radiation originating from the referenced solar-sourced radiation, and which may be a product of further optical processing performed on the referenced solar-sourced radiation. For example, such further optical processing may include removing a spatial radiation portion (e.g., beam splitting), removing a spectral radiation portion (e.g., optical filtering), adding radiation from a different radiation source, increasing or decreasing intensity of some or all of radiation spectrum (e.g., concentration or divergence), collimating radiation or otherwise modifying a property of some or all of the radiation of the referenced solar-sourced radiation. By a referenced solar-sourced radiation being directed to or toward a referenced optical unit, optical operation, optical component or optical element (e.g., light beam directed to a light conduit) it is meant that the referenced radiation is directed along an optical path that includes the referenced optical unit, optical operation, optical component, or optical element, which optical path may include intermediate optical processing prior to encountering the referenced optical unit, optical operation, optical component or optical element. Operations or steps of any method or process need not be performed in any particular order unless a particular order is expressly specified or technically required.

What is claimed is:

1. A solar light system, comprising a solar radiation collection and processing system to receive incident solar radiation during daylight hours and to process the incident solar radiation to prepare and provide processed solar radiation including concentrated visible light, the collection and processing system including:
   a first stage optical concentrator disposed to receive and concentrate solar radiation and prepare first concentrated solar radiation;

an optical filter to remove at least a portion of radiation outside of the visible light range, the optical filter disposed to receive as input at least a portion of the first concentrated solar radiation and to prepare spectrally-conditioned solar radiation including visible light;

a parallel-processing optical concentrator disposed to receive as input at least a portion of the spectrally-conditioned solar radiation and to prepare multiple beams of processed solar radiation including concentrated visible light, the parallel-processing optical concentrator comprising at least one parallel-processing array with a plurality of optical concentrating elements in a parallel-processing arrangement to receive and concentrate different spatial portions of solar-sourced radiation input to the parallel-processing array;

an optical collimator disposed along an optical path between the first stage optical concentrator and the parallel-processing optical concentrator to provide the at least a portion of the spectrally conditioned solar radiation in a collimated form;

a plurality of light conduits corresponding to the multiple beams of processed solar radiation and with each different single said light conduit corresponding to a single corresponding said optical concentrating element and disposed to receive at least a portion of the processed solar radiation of a different said beam.

2. A system according to claim 1, wherein the first stage optical concentrator comprises a Fresnel lens.

3. A system according to claim 1, wherein the first stage optical concentrator increases an intensity of visible light by a factor of 20 to 2500.

4. A system according to claim 3, wherein the processed solar radiation includes visible range light with an intensity of 1000 times to 12,500 times that of the incident solar radiation.

5. A system according to claim 1, wherein each said light conduit comprises an optical fiber.

6. A system according to claim 1, wherein each said light conduit has length in a range of from 3 to 150 meters.

7. A system according to claim 1, wherein proximal ends of the plurality of light conduits are retained in fixed relation relative to each other and separated by a distance of at least 2 millimeters by a retaining structure.

8. A system according to claim 1, wherein the parallel-processing optical concentrator comprises a plurality of said parallel-processing arrays in series and each including a different said plurality of optical concentrating elements in a parallel-processing arrangement; and
 a said parallel-processing array that is last in series comprises a said plurality of optical concentrating elements corresponding in number with the plurality of said light conduits.

9. A system according to claim 8, wherein at least one said parallel-processing array comprises aberration-correcting optical components as the optical concentrating elements.

10. A system according to claim 1, wherein each said optical concentrating element has an aperture with a maximum cross dimension in the range of from 0.5 to 25 millimeters; and
 each said light conduit comprises an optical fiber having a maximum cross dimension of from 0.25 to 12.5 millimeters.

11. A system according to claim 1, wherein in the parallel-processing array the said plurality of optical concentrating elements are in a single fabricated piece of material.

12. A system according to claim 1, wherein for at least one said parallel-processing array each said optical concentrating element is a light funnel comprising a tapered waveguide.

13. A system according to claim 12, wherein a distal end of each said light funnel abuts a proximal end of a different corresponding one of the plurality of light conduits; and
 the distal end each said light funnel is adhered to the proximal end of the corresponding said light conduit with an optically-conductive light-conductive adhesive.

14. A system according to claim 13, comprising a parallel-processing array of aberration-correcting optical component with each said aberration-correcting optical component disposed in the optical path of and adjacent to a proximal end of a different said optical-concentrating element.

15. A system according to claim 14, wherein the aberration-correcting optical components are field lenses.

16. A system according to claim 1, wherein the parallel-processing optical concentrator corresponds with from 4 to 100 of said light conduits.

17. A system according to claim 1, comprising a photovoltaic electrical power generator, and wherein the optical filter is operable to remove at least a portion of solar infrared radiation and direct removed solar infrared radiation to operate the photovoltaic electrical power generator.

18. A system according to claim 1, wherein the optical filter comprises at least one dichroic mirror.

19. A system according to claim 1, comprising:
 a plurality of solar radiation collection and processing units each comprising a said first stage optical concentrator, a said optical filter and a said parallel optical concentrator disposed to receive and concentrate solar radiation and prepare first concentrated solar radiation;
 each said collection and processing unit being optically connected with a different said plurality of light conduits to receive at least a portion of the processed solar radiation from the corresponding said collection and processing unit; and
 the plurality of collection and processing units being two-axis adjustably mounted on a mechanical support structure for two-axis solar tracking, with the plurality of collection and processing units being mechanically interconnected with a single solar tracking mechanical actuation system to actuate adjustment of positioning of the plurality of collection and processing units in unison by the mechanical actuation system for two-axis solar tracking of the plurality of collection and processing units.

20. A system according to claim 1, wherein the optical collimator is disposed between the first stage optical concentrator and the optical filter to provide the first concentrated solar radiation as collimated radiation to the optical filter.

21. A method according to claim 1, wherein the optical collimating is performed prior to the removing at least a portion of the first concentrated radiation outside of the visible light range to direct the first concentrated solar radiation as collimated radiation to the removing.

22. A method for solar light processing, the method comprising:
 optically processing incident solar radiation to prepare processed solar radiation including concentrated visible light and transmitting at least a portion of the processed solar radiation to a location for use;
 the optically processing comprising:

first stage concentrating at least a portion of collected incident solar radiation to prepare a first concentrated solar radiation;

removing at least a portion of the first concentrated solar radiation outside of the visible light range to prepare spectrally-conditioned solar radiation;

second stage concentrating at least a portion of the spectrally-conditioned solar radiation through a parallel-processing optical concentrator to prepare multiple light beams of processed solar radiation including concentrated visible light, the parallel-processing optical concentrator comprising a parallel-processing array with a plurality of optical concentrating elements in a parallel-processing arrangement to concentrate different spatial portions of solar radiation input to the parallel-processing array; and optically collimating along an optical path between the first stage concentrating and the second stage concentrating to provide the at least a portion of the spectrally-conditioned solar radiation in a collimated form; and wherein the transmitting comprises optically coupling each said beam of processed solar radiation to a single different one of a plurality of light conduits for transmission to another location for use of the concentrated visible light.

* * * * *